United States Patent [19]
Duffney et al.

[11] Patent Number: 5,655,852
[45] Date of Patent: Aug. 12, 1997

[54] HIGH VACUUM EXTRACTION OF SOIL CONTAMINANTS ALONG PREFERENTIAL FLOW PATHS

[75] Inventors: Eliott N. Duffney, Rochester; Paul M. Tornatore, Pittsford; Scott M. Huber, Canandaigua; Ronald E. Hess, Webster, all of N.Y.

[73] Assignee: Xerox Corporation, Stamford, Conn.

[21] Appl. No.: 751,279

[22] Filed: Nov. 18, 1996

Related U.S. Application Data

[63] Continuation of Ser. No. 235,571, Apr. 29, 1994, abandoned.

[51] Int. Cl.$^6$ ............................. E02D 3/00; E21B 43/00
[52] U.S. Cl. ............................. 405/258; 166/306
[58] Field of Search ............................. 166/268, 269, 166/271, 306; 405/128, 258

[56] References Cited

U.S. PATENT DOCUMENTS

| | | | |
|---|---|---|---|
| 2,605,637 | 8/1952 | Rhoades | 166/313 X |
| 2,925,097 | 2/1960 | Deusterberg | 166/313 X |
| 3,251,413 | 5/1966 | Rudisell | |
| 3,667,545 | 6/1972 | Knight | 166/269 |
| 3,735,815 | 5/1973 | Myers | |
| 3,957,116 | 5/1976 | Bouck | 166/269 X |
| 3,983,939 | 10/1976 | Brown et al. | 166/269 |
| 3,990,514 | 11/1976 | Kreinin et al. | 166/271 |
| 4,265,310 | 5/1981 | Britton et al. | 166/271 X |
| 4,640,355 | 2/1987 | Hong et al. | 166/269 |
| 4,669,542 | 6/1987 | Venkatesan | 166/268 X |
| 4,785,882 | 11/1988 | Sprunt | 166/268 X |
| 4,834,178 | 5/1989 | Knecht et al. | 166/261 |
| 5,018,576 | 5/1991 | Udell et al. | 405/258 X |
| 5,032,042 | 7/1991 | Schuring et al. | 405/258 |
| 5,050,676 | 9/1991 | Hess et al. | 166/267 |
| 5,076,360 | 12/1991 | Morrow | 166/267 |
| 5,161,613 | 11/1992 | Jones | 166/242 |
| 5,172,764 | 12/1992 | Hajali et al. | 166/267 |
| 5,190,108 | 3/1993 | Mansuy | 166/371 |
| 5,197,541 | 3/1993 | Hess et al. | 166/67 |
| 5,246,070 | 9/1993 | Greve et al. | 166/242 |

FOREIGN PATENT DOCUMENTS

| | | |
|---|---|---|
| 498676 | 8/1992 | European Pat. Off. |
| 586005 | 3/1994 | European Pat. Off. |

*Primary Examiner*—John A. Ricci

[57] ABSTRACT

Disclosed is a process and apparatus for removing contaminants from a contaminated area of the ground, the ground having a plurality of paths of preferential flow at different depths, which process comprises providing a borehole in the contaminated area to intersect at least a first path of preferential flow and a second path of preferential flow; placing in the borehole a first vacuum extraction pipe having a bottom opening situated within the first path of preferential flow and a second vacuum extraction pipe having a bottom opening situated within the second path of preferential flow; isolating the first path of preferential flow from the second path of preferential flow so that a vacuum applied to the first vacuum extraction pipe will extract gases and liquids from only the first path of preferential flow, and a vacuum applied to the second vacuum extraction pipe will extract gases and liquids from only the second path of preferential flow; applying a vacuum to at least one of the vacuum extraction pipes to draw gases and liquid from at least one of the paths of preferential flow into a vacuum extraction pipe and transport the gases and liquid to the surface as a common stream; forming from the common stream a stream which is liquid and a stream which is gaseous; and removing contaminants from the liquid and/or gaseous streams.

30 Claims, 12 Drawing Sheets

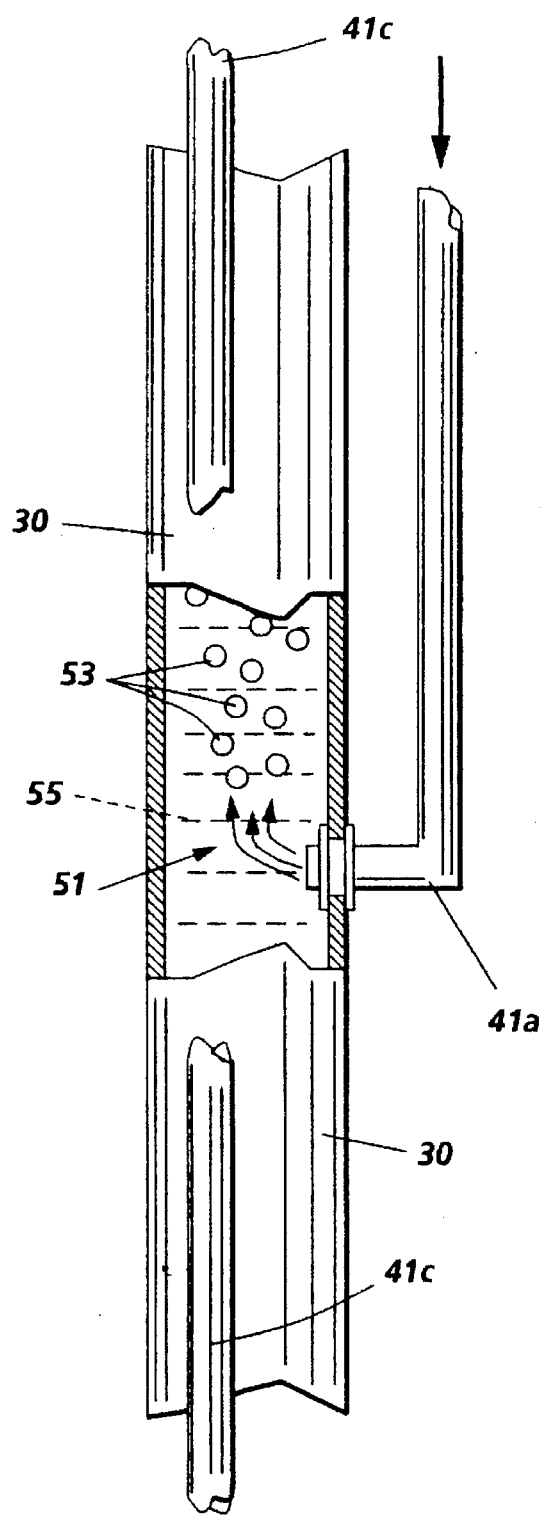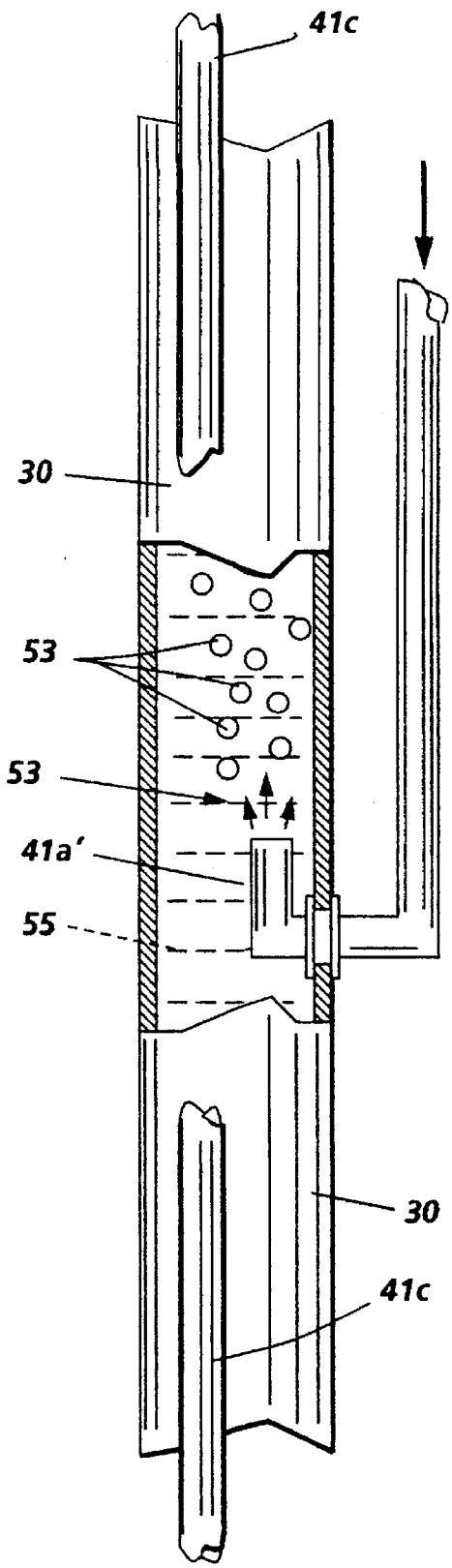
FIG. 5    FIG. 6

HIGH VACUUM EXTRACTION OF SOIL CONTAMINANTS ALONG PREFERENTIAL FLOW PATHS

This application is a continuation of application Ser. No. 08/235,571, filed Apr. 29, 1994, now abandoned.

BACKGROUND OF THE INVENTION

The present invention is directed to processes for extracting contaminants from soil liquids and gases along paths of preferential flow in the ground. More specifically, the present invention is directed to processes for selectively extracting contaminants by high-vacuum techniques from at least two different preferential flow paths in the ground with a single well. One embodiment of the present invention is directed to a process for removing contaminants from a contaminated area of the ground comprising soil having a first permeability, said ground having a plurality of paths of preferential flow, each path having a permeability at least ten times greater than the first permeability, which process comprises providing a borehole in the contaminated area to intersect at least a first path of preferential flow and a second path of preferential flow, said second path of preferential flow being situated at a depth greater than said first path of preferential flow; placing in the borehole a first vacuum extraction pipe having a bottom opening situated within the first path of preferential flow and a second vacuum extraction pipe having a bottom opening situated within the second path of preferential flow; isolating the first path of preferential flow from the second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow; applying a vacuum to at least one of the vacuum extraction pipes to draw gases and liquid from at least one of the paths of preferential flow into a vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Another embodiment of the present invention is directed to an apparatus for removing contaminants from a contaminated area of the ground comprising soil having a first permeability, said ground having a plurality of paths of preferential flow, each path having a permeability at least ten times greater than the first permeability, said contaminated area of the ground being provided with a borehole extending downwardly from the surface of the ground to intersect at least a first path of preferential flow and a second path of preferential flow, said second path of preferential flow being situated at a depth greater than said first path of preferential flow, said apparatus comprising at least a first vacuum extraction pipe and a second vacuum extraction pipe situated inside of the borehole, wherein the first vacuum extraction pipe has a bottom opening situated within the first path of preferential flow and the second vacuum extraction pipe has a bottom opening situated within the second path of preferential flow, said first path of preferential flow being isolated from said second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow; a vacuum-forming apparatus in fluid communication with the first vacuum extraction pipe and the second vacuum extraction pipe and adapted to form a zone of reduced pressure in the first and second paths of preferential flow around the borehole, whereby gases and liquid can be drawn from the first and second paths of preferential flow into a vacuum extraction pipe and conveyed to the surface as a common stream; a vapor-liquid separator in fluid communication with said vacuum-forming apparatus and said first and second vacuum extraction pipes, wherein said vapor-liquid separator separates the common stream into separate gas and liquid streams; and a contaminant removal system, said contaminant removal system being situated to remove contaminants from at least one of the liquid stream and the gas stream.

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and dealt with in the vadose (unsaturated) zone found between the surface of the earth and the water table, at the interface between the vadose zone and the water table, and in the saturated zone below the water table.

At many industrial and commercial facilities and at waste handling and disposal sites, soil and groundwater are contaminated with suspended or water-soluble chemicals, or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. No. 4,323,122 (Knopik) discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Others have suggested the possibility of venting soil above the water table (i.e., in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639 (Visser et al.), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass.", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The two-phase stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 (Visser et al.), the disclosure of which is totally incorporated herein by reference, and U.S. Pat. No. Re. 33,102, the disclosure of which is totally incorporated herein by reference, also disclose processes for removal of volatile contaminants from the vadose zone of contaminated ground by pumping Volatilized contaminants from the vadose zone using one or more vacuum extraction wells.

"Forced Venting to Remove Gasoline Vapor from a Large-Scale Model Aquifer," American Petroleum Institute, Health and Environmental Sciences Department, API Publication No. 4431 (1984) discloses the results of experiments examining forced venting of air through the soil above a gasoline spill in a model aquifer. Various flow rates and geometries for the venting plumbing were used to determine the most efficient method of removing gasoline from the underground environment and lowering gasoline vapor concentrations in the unsaturated zone above the spill.

"Venting for the Removal of Hydrocarbon Vapors from Gasoline Contaminated Soil," J. Thornton and W. Wootan, *J. Environ. Sci. Health*, A17(1), 31–44 (1982) discloses the results of an experiment investigating the use of a venting strategy to remove gasoline vapors from contaminated soil strata. A contained gasoline leak was created in a large outdoor facility which simulates soil strata and a static water table. An air flow was established, and vapor samples taken before, during, and after venting were checked for hydrocarbon content.

U.S. Pat. No. 2,605,637 (Rhoades), the disclosure of which is totally incorporated herein by reference, discloses a method of subterranean surveying to determine the liquid levels of a plurality of superimposed fluid bearing strata through a single drill hole. A plurality of tubes are housed within a single drill hole. The tubes are positioned at varying subterranean fluid bearing strata and are used to measure liquid levels in each of the isolated strata.

U.S. Pat. No. 2,925,097 (Duesterberg), the disclosure of which is totally incorporated herein by reference, discloses a tubular member adapted to be positioned in the flow string of an oil or gas well. A plurality of flow tubes are placed within a wellbore for removing well fluids. The tubes comprise a perforate section that prevents cutting out or eroding caused by high fluid pressure or abrasive fluids.

U.S. Pat. No. 4,834,178 (Knecht et al.), the disclosure of which is totally incorporated herein by reference, discloses a process and apparatus for fireflooding with liquid heat transfer media comprising injection of oxidant gas and liquid heat transfer media into a well through separate conduits, the liquid conduit downstream end submerged in a liquid volume, so as to form a seal and prevent oxidant gas migration into the liquid conduit.

U.S. Pat. No. 5,161,613 (Jones), the disclosure of which is totally incorporated herein by reference, discloses a method and apparatus for treating multiple strata in a single operation from a single wellbore which penetrates a treatment interval which, in turn, includes a plurality of strata which, in turn, have different permeabilities. A treating fluid, such as a consolidating agent, acid, or the like, is delivered directly to different levels within a section of the wellbore adjacent the interval to be treated through a plurality of alternate paths which, in turn, lie substantially adjacent to the strata to be treated.

U.S. Pat. No. 5,190,108 (Mansuy), the disclosure of which is totally incorporated herein by reference, discloses the inhibition of biological fouling of water wells by replacing the air in the well column with an anoxic gas such as nitrogen to deprive aerobic bacteria of oxygen. The anoxic gas is applied from a cylindrical tank at the surface and through a gas pipe extending from the tank down into the well casing. The well casing is sealed near the top to prevent air infiltration and maintain a positive gas pressure. The anoxic gas is applied at a slightly positive pressure to maintain the well column filled with it and to prevent air penetration. The gas can be supplied to the well column only or to both the well column and the aquifer so that a blanket of gas in the area of the well inhibits air penetration of the water from the unsaturated cover layer above the aquifer.

U.S. Pat. No. 5,246,070 (Greve et al.), the disclosure of which is totally incorporated herein by reference, discloses a method for completing a groundwater monitoring site including several monitoring points disposed at different depths. The piping includes a single multi-conduit pipe having a smooth, tightly packable outer wall and being composed of individual pipe lengths which are coupled to each other in a sealed relationship. The pipe lengths are subdivided in the longitudinal direction into several conduits by partition walls and are coupled to each other in such a fashion that their conduits are in relative alignment at the junctures and not reduced in area. For the purpose of providing filter sections for the admission of water, individual pipe lengths are provided in their outer wall with filter slots in the area of one or several conduits.

U.S. Pat. No. 5,050,676 (Hess et al.) and U.S. Pat. No. 5,197,541 (Hess et al.), the disclosures of each of which are totally incorporated herein by reference, disclose apparatus and processes for two phase vacuum extraction of contaminants from the ground which entails vacuum withdrawal of liquid and gaseous phases as a common stream, separation of the liquid and gaseous phases, and subsequent treatment of the separated liquid and gases to produce clean effluents. Two phase vacuum extraction employs a single vacuum generating device to remove contaminants in both the liquid stream and soil gases through a single well casing.

U.S. Pat. No. 5,172,764 (Hajali et al.), the disclosure of which is totally incorporated herein by reference, discloses an apparatus and process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams.

U.S. Pat. No. 5,076,360 (Morrow), the disclosure of which is totally incorporated herein by reference, discloses methods and apparatus for vacuum extraction of contaminants from the ground which, in a preferred embodiment, entails vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well. The method permits vacuum extraction of both liquids and gases from the subsurface by way of wells having a liquid layer which is more than thirty feet below the soil surface or in which a screened interval of the extraction pipe is entirely below the liquid surface.

U.S. Pat. No. 5,358,357 (Mancini et al.), entitled "Improved Process and Apparatus for High Vacuum Groundwater Extraction," the disclosure of which is totally incorporated herein by reference, discloses a process and apparatus in which vacuum extraction is used to remove soil contaminants in both the saturated and vadose zones. One embodiment of the invention is directed to a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams.

Although known apparatus and processes are suitable for their intended purposes, a need remains for processes and apparatus for removing contaminants from groundwater and soil which enables contaminant removal from soils of varying air permeability and varying porosity. Further there is a need for processes and apparatus for removing contaminants from groundwater and soil which enables increased flexibility in the location of extraction wells. There is also a need for processes and apparatus for removing contaminants from groundwater and soil that can be implemented by modifying existing vacuum extraction systems.

Further, in some instances it may be desirable to remove contaminants from groundwater and soil gases from ground comprising relatively impermeable soils, such as silt, clay, mixtures of sand, silt, and clay, massive clay, or the like, or from ground comprising relatively impermeable rock, such as laminated sandstone, shale, mudstone, massive igneous and metamorphic rock, or the like. The permeability of these soils, which generally ranges from about $10^{-6}$ to about $10^{-8}$ centimeters per second or lower, is sufficiently low that many known processes for extracting ground contaminants are not suitable or efficient; known processes typically are suitable in soils with permeabilities of no less than about $10^{-4}$ centimeters per second.

Additionally, it may be desirable to remove contaminants selectively from one or more paths of preferential flow within an area of the ground, where areas of relatively low permeability are surrounded by areas of relatively high permeability. It is also desirable, in this instance, to be able to extract contaminants selectively from one or more paths of preferential flow through a single borehole or well. Extracting contaminants through a single borehole from multiple paths of preferential flow enables reduced installation costs, reduced and simpler apparatus, and less disruption to business in the contaminated area. Further, it may be desirable to apply vacuum extraction to one or more preferential flow paths while at the same time introducing a fluid (including gases and/or liquids) into one or more adjacent flow paths. In addition, it may be desirable to apply vacuum extraction to a plurality of preferential flow paths either simultaneously or in a desired sequence.

SUMMARY OF THE INVENTION

It is an object of the present invention to provide a process and apparatus for removing contaminants from groundwater and soil with the above noted advantages.

It is another object of the present invention to provide a process and apparatus for removing contaminants from groundwater and soil which enables contaminant removal from soils of varying air permeability and varying porosity.

It is yet another object of the present invention to provide a process and apparatus for removing contaminants from groundwater and soil which enables increased flexibility in the location of extraction wells.

It is still another object of the present invention to provide a process and apparatus for removing contaminants from groundwater and soil that can be implemented by modifying existing vacuum extraction systems.

Another object of the present invention is to provide a process and apparatus for removing contaminants from groundwater and soil which enables contaminant removal from ground comprising relatively impermeable soils or relatively impermeable rock.

Yet another object of the present invention is to provide a process and apparatus for removing contaminants from groundwater and soil which enables contaminant removal from ground having a permeability of no more than about $10^{-6}$ centimeters per second.

Still another object of the present invention is to provide a process and apparatus for removing contaminants from groundwater and soil which enables selective contaminant removal from one or more paths of preferential flow within an area of the ground through a single borehole.

It is another object of the present invention is to provide a process and apparatus for removing contaminants from groundwater and soil which enables application of vacuum extraction to one or more preferential flow paths while at the same time introducing a fluid into one or more adjacent flow paths.

It is yet another object of the present invention to provide a process and apparatus for removing contaminants from groundwater and soil which enables application of vacuum extraction to a plurality of preferential flow paths either simultaneously or in a desired sequence.

These and other objects of the present invention (or specific embodiments thereof) can be achieved by providing a process for removing contaminants from a contaminated area of the ground comprising soil having a first permeability, said ground having a plurality of paths of preferential flow, each path having a permeability at least ten times greater than the first permeability, which process comprises providing a borehole in the contaminated area to intersect at least a first path of preferential flow and a second path of preferential flow, said second path of preferential flow being situated at a depth greater than said first path of preferential flow; placing in the borehole a first vacuum extraction pipe having a bottom opening situated within the first path of preferential flow and a second vacuum extraction pipe having a bottom opening situated within the second path of preferential flow; isolating the first path of preferential flow from the second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow; applying a vacuum to at least one of the vacuum extraction pipes to draw gases and liquid from at least one of the paths of preferential flow into a vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Another embodiment of the present invention is directed to an apparatus for removing contaminants from a contaminated area of the ground comprising soil having a first permeability, said ground having a plurality of paths of preferential flow, each path having a permeability at least ten times greater than the first permeability, said contaminated area of the ground being provided with a borehole extending downwardly from the surface of the ground to intersect at least a first path of preferential flow and a second path of preferential flow, said second path of preferential flow being situated at a depth greater than said first path of preferential flow, said apparatus comprising at least a first vacuum extraction pipe and a second vacuum extraction pipe situated inside of the borehole, wherein the first vacuum extraction pipe has a bottom opening situated within the first path of preferential flow and the second vacuum extraction pipe has a bottom opening situated within the second path of preferential flow, said first path of preferential flow being isolated from said second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow; a vacuum-forming apparatus in fluid communication with the first vacuum extraction pipe and the second vacuum extraction pipe and adapted to form a zone of reduced pressure in the first and second paths of preferential flow around the borehole, whereby gases and liquid can be drawn from the first and second paths of preferential flow into a vacuum extraction pipe and conveyed to the surface as a common stream; a vapor-liquid separator in fluid communication with said vacuum-forming apparatus and said first and second vacuum extraction pipes, wherein said vapor-liquid separator separates the common stream into separate gas and liquid streams; and a contaminant removal system, said contaminant removal system being situated to remove contaminants from at least one of the liquid stream and the gas stream.

BRIEF DESCRIPTION OF THE DRAWINGS

Illustrated schematically in FIG. 1 is a side elevation view in cross section illustrating a general arrangement for vacuum extraction of contaminants from a contaminated area of the ground in accordance with the present invention.

Illustrated schematically in FIG. 2 is a cross-sectional view in side elevation of an extraction well suitable for the present invention.

Figure 3:
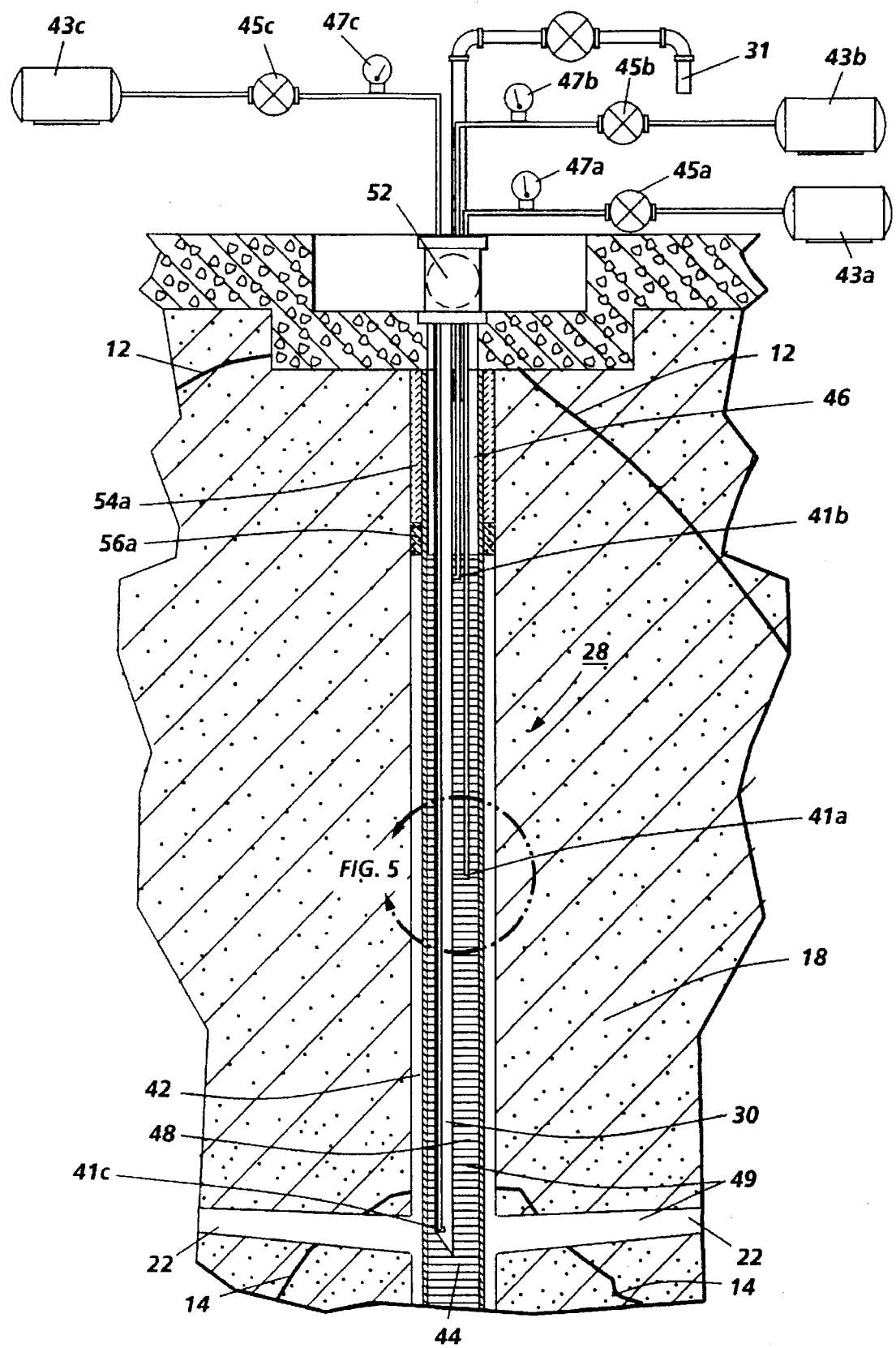

Illustrated schematically in FIG. 3 is a cross-sectional view in side elevation of another extraction well suitable for the present invention.

Figure 4:
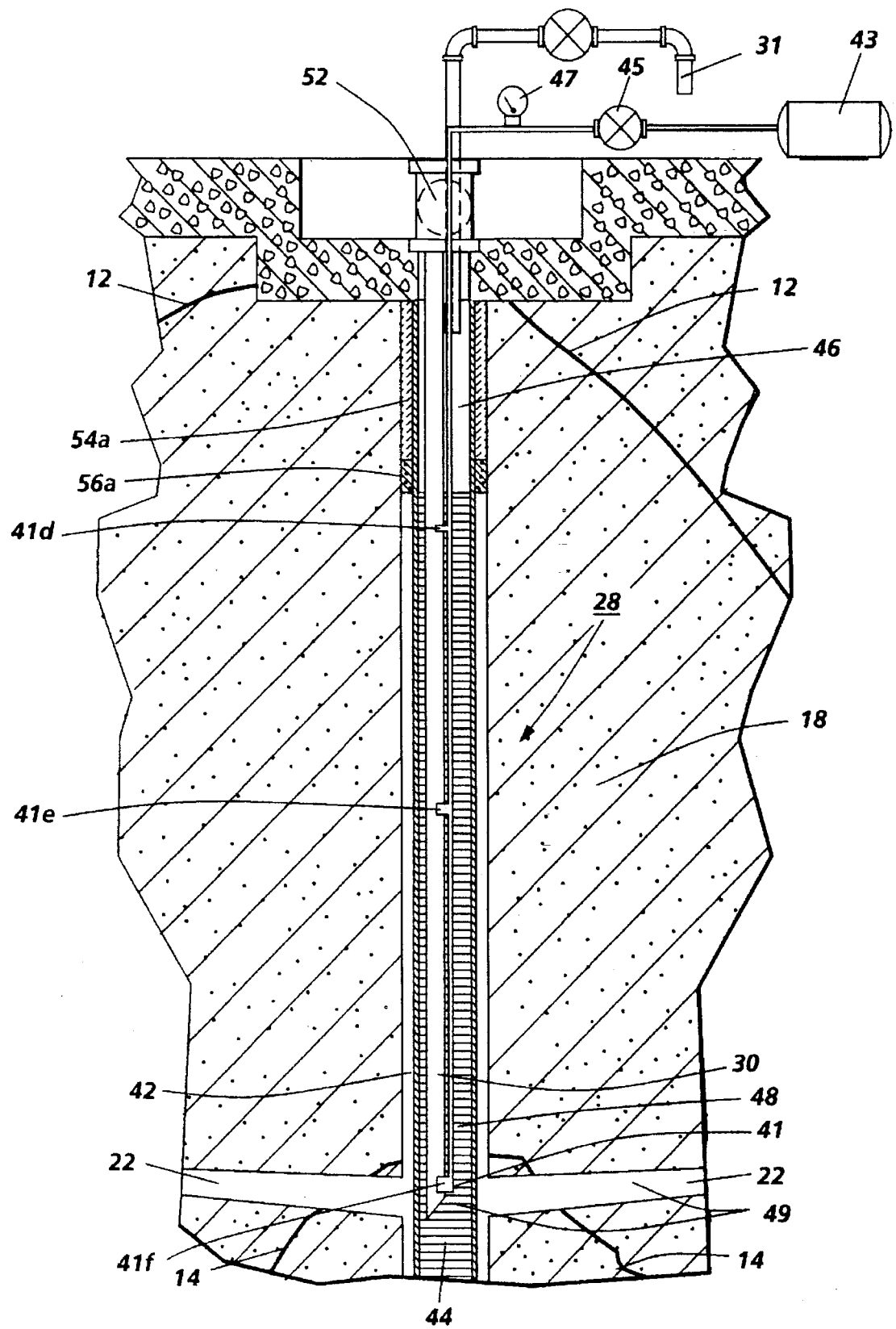

Illustrated schematically in FIG. 4 is a cross-sectional view in side elevation of yet another extraction well suitable for the present invention.

Figure 7:
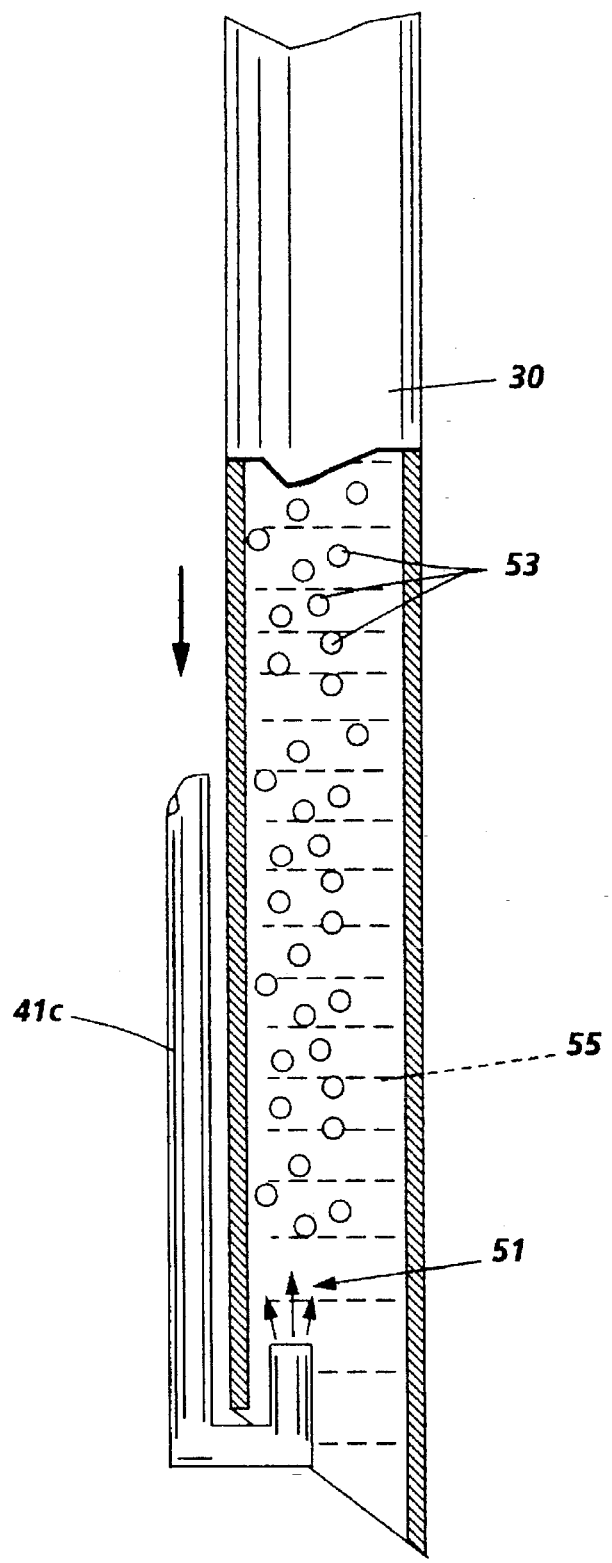

Illustrated schematically in FIGS. 5, 6, and 7 are cross-sectional views in side elevation of three suitable configurations for optional gas inlets into a vacuum extraction pipe in an extraction will of the present invention.

Figure 8:
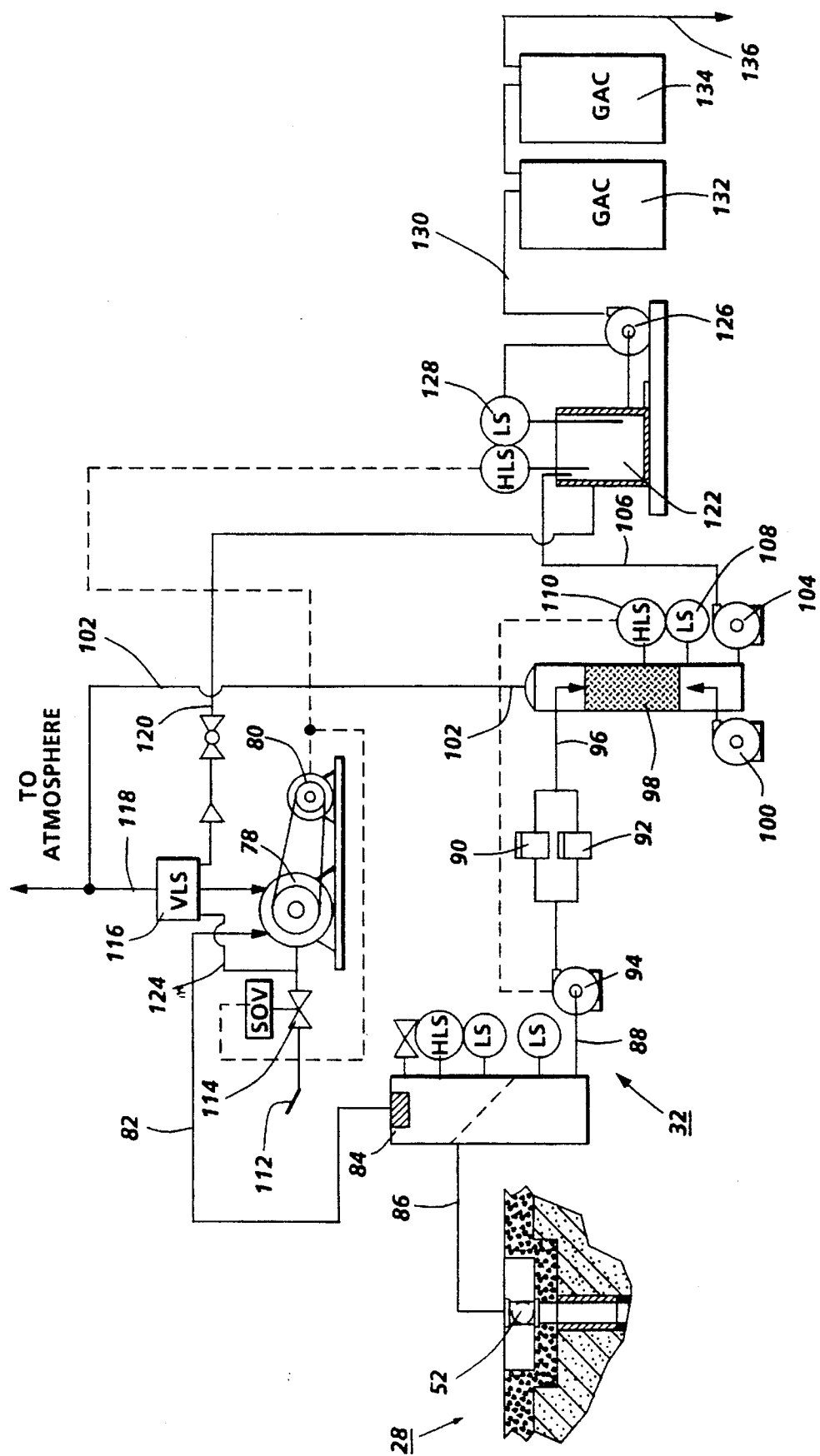

Illustrated schematically in FIG. 8 is a schematic view of an example of an apparatus for handling and treating materials removed from the ground by the vacuum extraction apparatus and process of the present invention.

Figure 9:
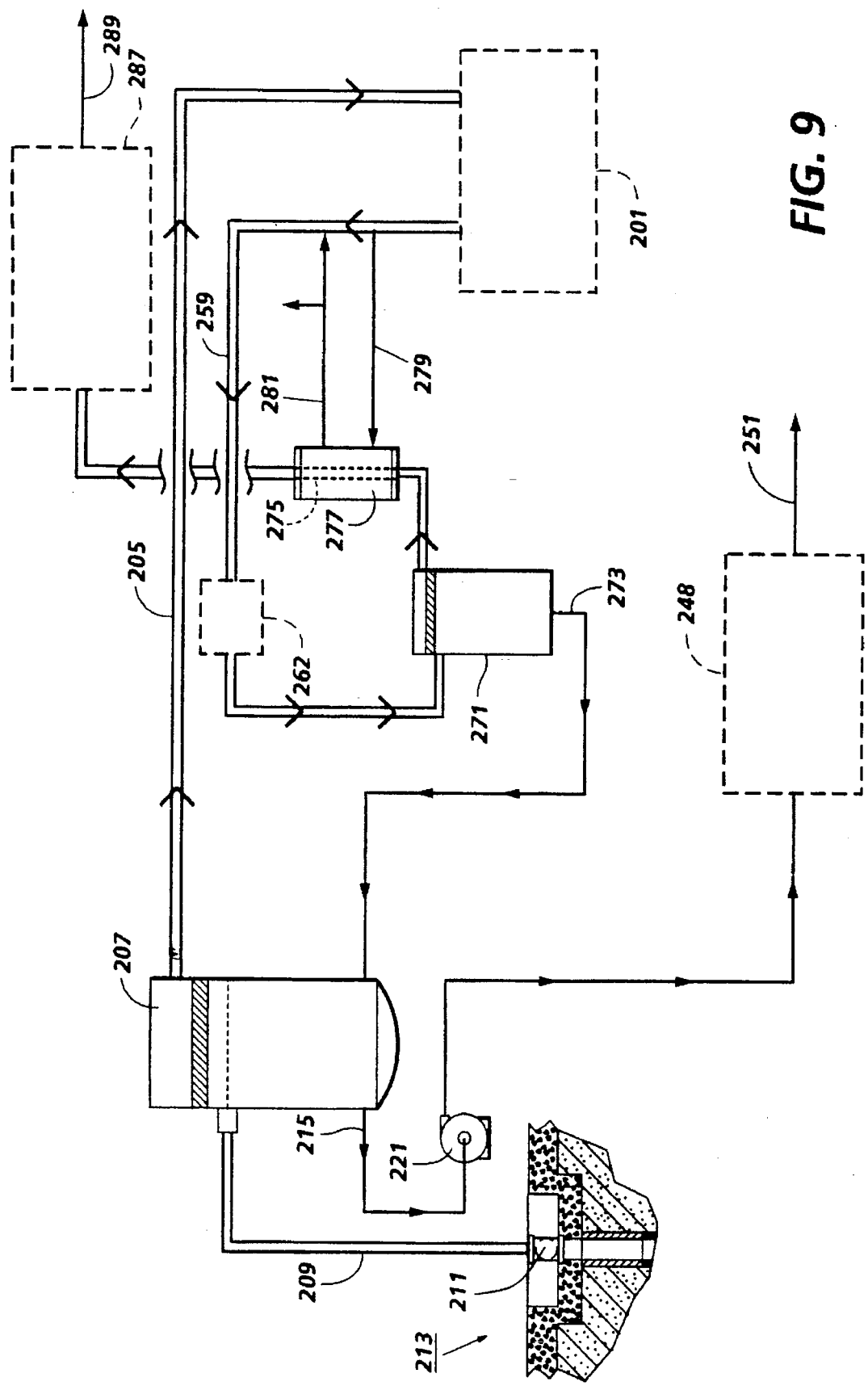

Illustrated schematically in FIG. 9 is a schematic view of another example of an apparatus for handling and treating materials removed from the ground by the vacuum extraction apparatus and process of the present invention.

Figure 10:
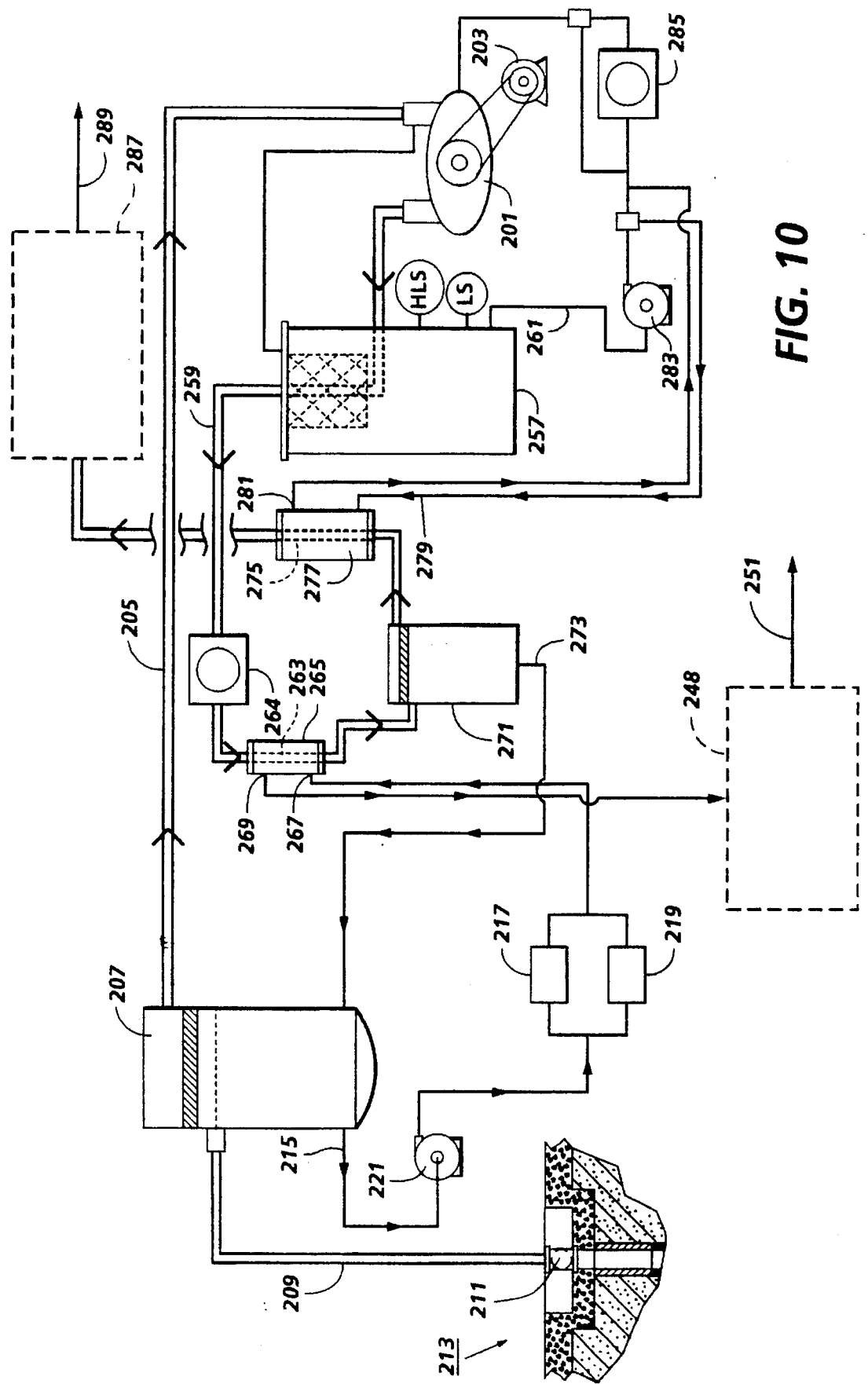

Illustrated schematically in FIG. 10 is a schematic view of yet another example of an apparatus for handling and treating materials removed from the ground by the vacuum extraction apparatus and process of the present invention.

Figure 11:
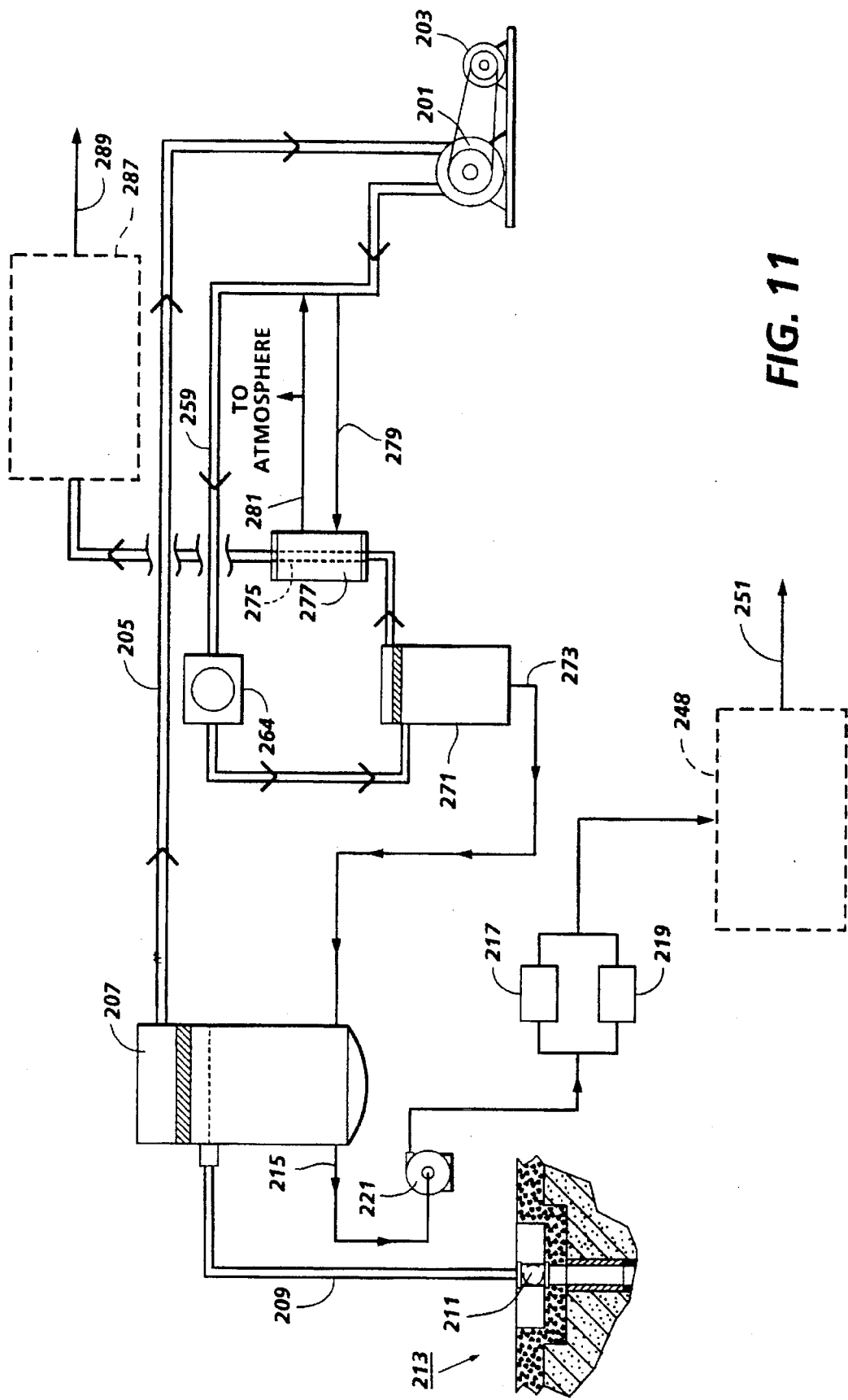

Illustrated schematically in FIG. 11 is a schematic view of still another example of an apparatus for handling and treating materials removed from the ground by the vacuum extraction apparatus and process of the present invention.

Figure 12:
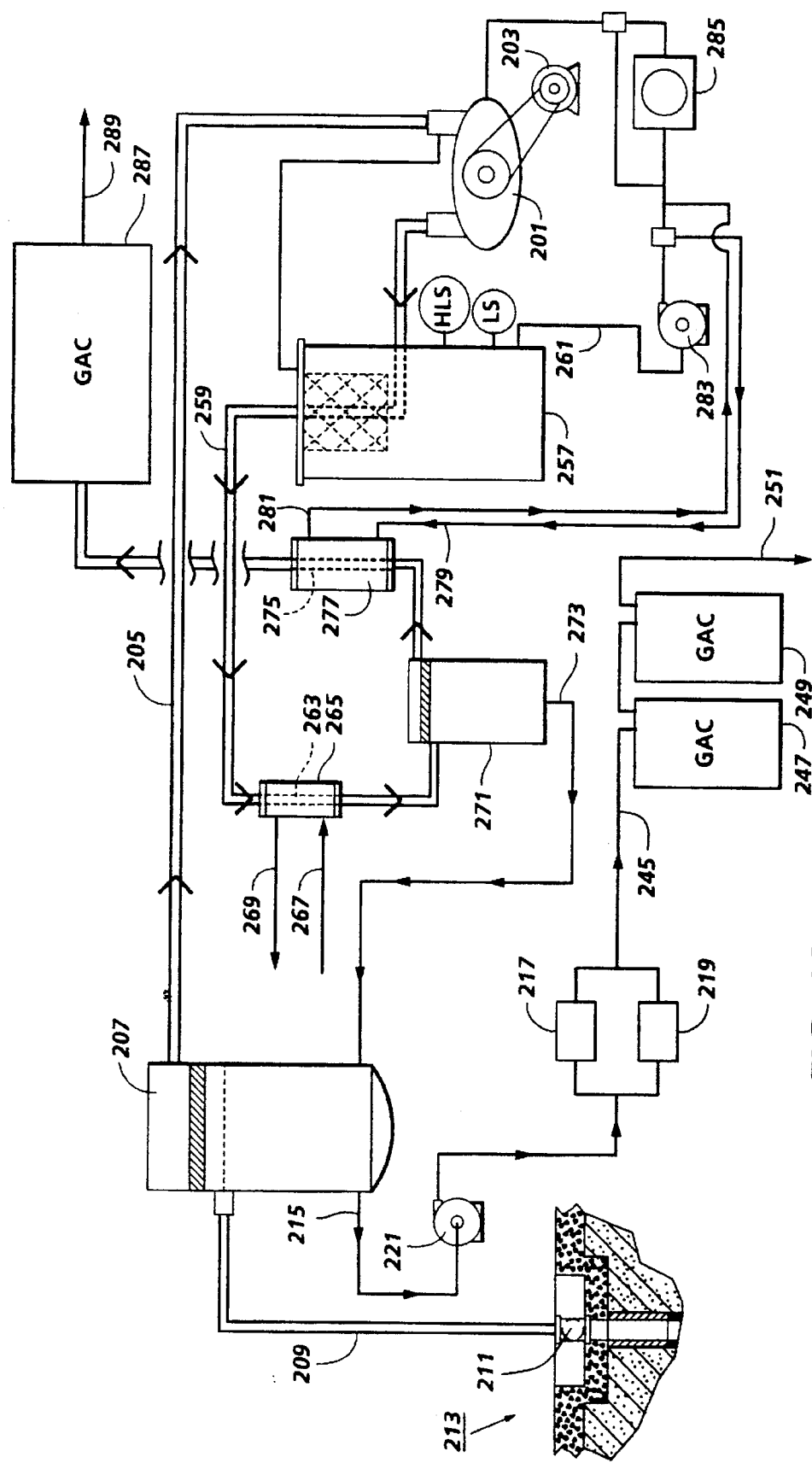

Illustrated schematically in FIG. 12 is a further example of an apparatus for handling and treating materials removed from the ground by the vacuum extraction apparatus and process of the present invention.

Figure 13:
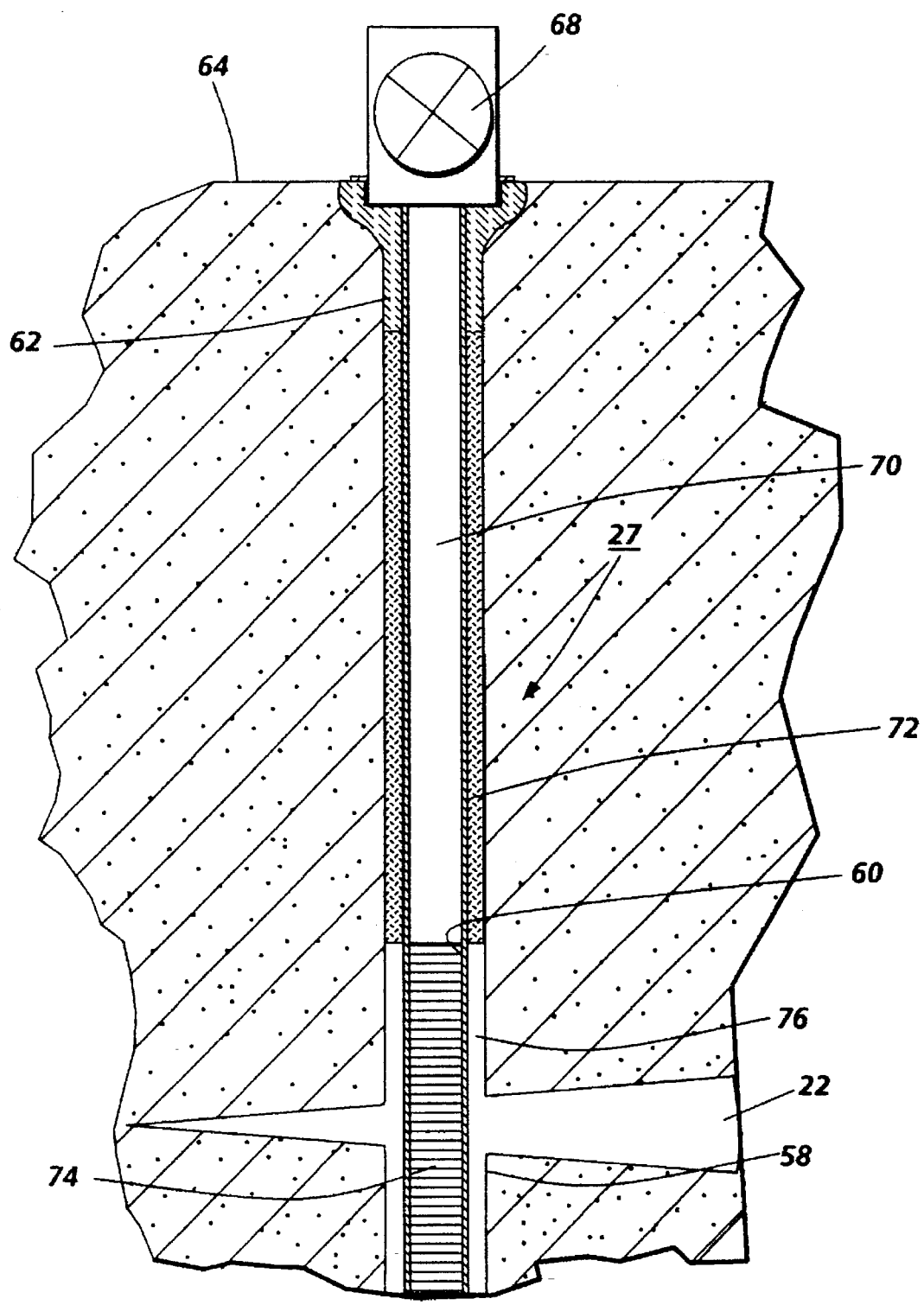

Illustrated schematically in FIG. 13 is a cross-sectional view in side elevation of an air inlet well suitable for use with the present invention.

DETAILED DESCRIPTION OF THE INVENTION

The present invention is directed to a process and apparatus for the removal of contaminants from groundwater and soil along paths of preferential flow.

Contaminants can be present in the vadose zone and/or below the water table. Treated water can be returned to the soil or disposed of in conventional ways. In one embodiment of the invention, each vacuum extraction pipe is surrounded with a riser pipe. Each riser pipe is constructed with perforations (screening) which may be situated below the natural water table, in the unsaturated (vadose) zone, or both in the saturated and saturated zones. In one embodiment, one riser pipe has perforations both above and below the water table. In another embodiment of the invention, at least one riser pipe is constructed with perforations (screening) extending only below the water table. In yet another embodiment, at least one riser pipe has perforations only in the vadose zone above the water table. The unsaturated zone can be the natural vadose zone lying above the natural water table, or an expanded "artificial" vadose zone created when removal of the groundwater through the extraction well causes local lowering of the water table. Placing of the screening so that it extends both below the water table and into the vadose zone allows soil gases, including contaminants in the vapor phase, to be drawn into the riser pipe under the influence of a vacuum generator connected to the vacuum extraction pipe. The gases entrain the liquid phase, so that both phases can be transported to the surface together in a common stream through the vacuum extraction pipe. At the surface, the two phases are separated in a vapor-liquid disengaging vessel, such as a cyclone separator, knock-out pot or other suitable component, and after separation the phases can individually be routed to systems for contaminant removal by further treatment steps. Suitable processes for contaminant removal include filtration, adsorption, air stripping, settling, flocculation, precipitation, scrubbing and the like.

As an alternative, one or more riser pipes can be situated so that the screening is at all times below the water table, even in the situation in which removal of water causes local depression of the water table. In such an arrangement, the fluid transported to the surface from this riser pipe is predominantly in the liquid phase, although it may still be necessary to provide vapor-liquid separation and individual phase treatment at the surface to deal with phase transformation which may occur as a result of turbulence and pressure reduction at the suction side of the vacuum device. A slotted riser pipe surrounding each vacuum extraction pipe is preferred when the soil is particulate to prevent the entrainment of silts, soils, or sediments into the vacuum extraction pipe, which could clog or damage the vacuum extraction system. When the surrounding soil is rock, slotted riser pipes are not necessary.

Figure 1:
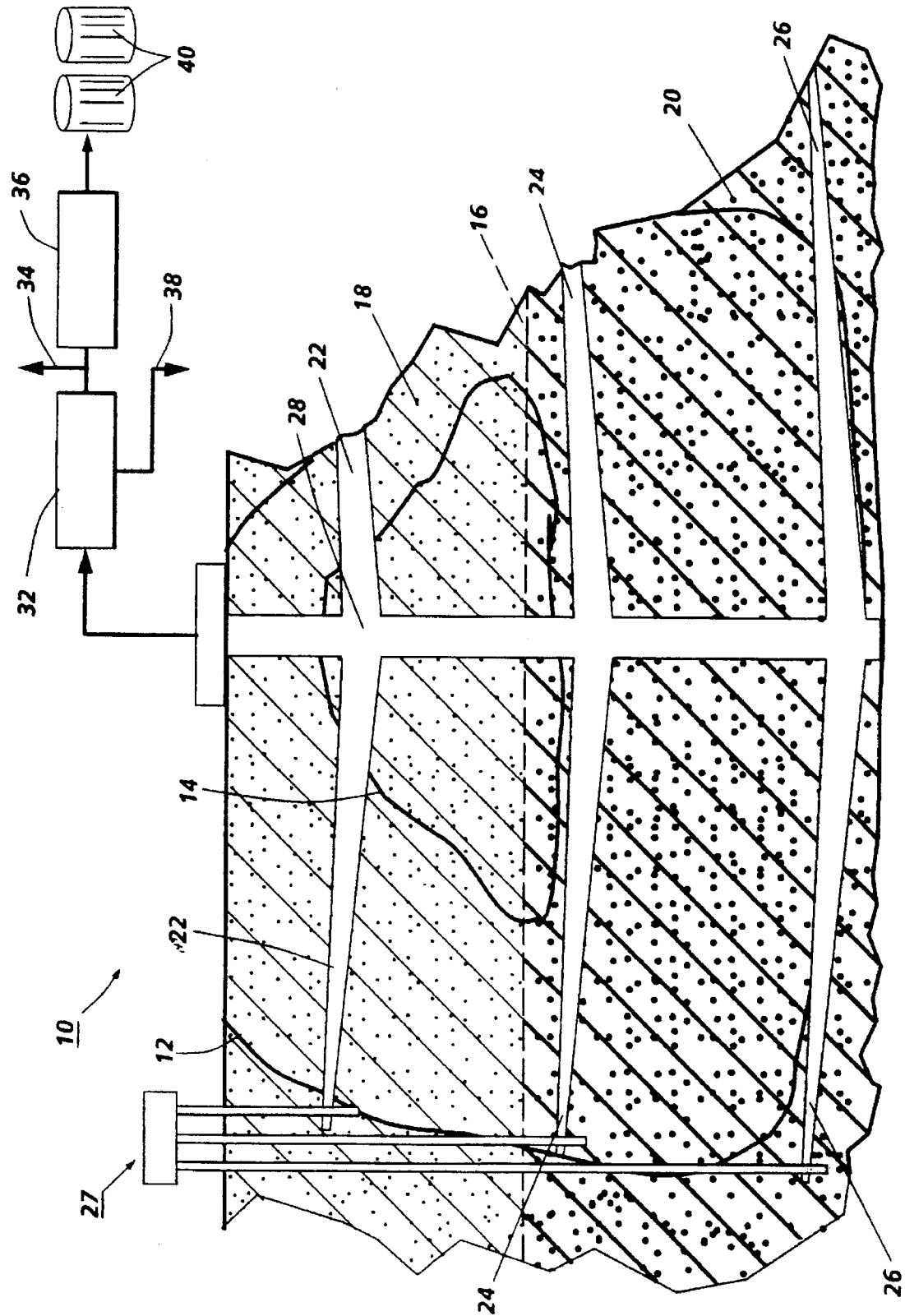

FIG. 1 (not drawn to scale) illustrates schematically a system, designated generally by the reference numeral 10, for vacuum extraction and treatment in accordance with the invention. Seen in FIG. 1 is a contaminated zone 12, wherein the contaminants in central zone 14 are more highly concentrated in the soil than in surrounding zone 12. The contaminants are adsorbed, dissolved, or suspended free phase and gaseous phase contaminants in the soil. As illustrated in FIG. 1, dashed line 16 represents the interface between upper soil 18, which typically is more permeable than lower soil 20. For example, upper soil 18 may be weathered clay, with a typical permeability of about $1\times10^{-7}$ centimeters per second, and lower soil 20 may be unweathered clay, with a typical permeability of about $1\times10^{-8}$ centimeters per second. It is not required, however, for the purposes of the present invention, that contaminated zone 12 extend into two or more areas of differing soil permeability; contaminated zones 12 and 14, preferential flow paths 22, 24, and 26, and extraction well 28 may all be situated within soil of a single permeability.

Within the soil containing contaminated zone 12 are paths of preferential flow 22, 24, and 26, wherein the soil is significantly more permeable than either uppersoil 18 or lower soil 20. The permeabilities of soil within the preferential flow paths typically are at least one order of magnitude greater than the permeability of the soil surrounding the preferential flow paths. For example, the surrounding soil might have a permeability of about $1\times10^{-4}$ centimeters per second or less while the paths of preferential flow might have permeabilities of $1\times10^{-3}$ centimeters per second or greater. These paths of preferential flow may be either naturally occurring or may be artificially created in the contaminated area. Artificial preferential flow paths can be created by, for example, fracturing processes, wherein relatively permeable flow areas are created within relatively impermeable soil. For example, hydraulic fracturing entails driving a casing and a lance tip, said casing and lance tip being of any suitable material, such as steel or the like, into the soil to the desired depth of the fracture closest to the surface. Thereafter, an extension rod is driven into the casing to drive the lance tip further into the soil, to a depth below the terminal end of the casing. The extension rod and lance tip are thereafter removed from the casing, leaving the empty casing in the ground with a well of exposed soil below the terminal end of the casing. A notch is then cut in the soil below the terminal end of the casing by a cutting jet of water, said notch extending horizontally and perpendicular to the vertical casing. Thereafter, a sand-filled slurry is injected under pressure into the casing; the casing prevents diffusion of the slurry in all areas except the exposed soil within the notch below the terminal end of the casing, and the pressure causes a horizontal hydraulic fracture to be extended from the notch edges. The fracture thus created contains sand, which assists in prevention of future collapse of the fracture, and enables gases and liquids to flow through the fracture at rates significantly higher than are possible in the relatively impermeable surrounding soil. Thereafter, additional fractures can be created at progressively lower levels by inserting a longer casing and the lance tip into the original hole in the ground and driving them to the desired depth, followed by cutting of a new notch at a lower level and injection of the slurry to create a new fracture. Fractures can be created at any desired spacings, typically at least 6 inches (15 centimeters) apart, although the distance between fractures may be lower if desired. In a preferred embodiment, the slurry injected into the fractures comprises a mixture of sand, water, and crosslinked guar gum, the mixture being highly viscous. The mixture also includes a chemical agent such as an enzyme that attacks the crosslinking in the guar gum, so that over a period of time, typically about 1 or 2 days, the crosslinking in the guar gum breaks down, thereby lowering the viscosity of the slurry. Thereafter, the water drains from the slurry, leaving the sand remaining in the fracture. One example of a suitable commercially available additive to a sand/water slurry for this purpose is the REVERT® drilling fluid additive, available from Johnson Filtration Systems, Inc., St. Paul, Minn. This material contains guar gum and initially enhances the viscosity of the slurry, followed by a breakdown of the guar gum and resulting decreased viscosity within a few days.

Optionally, air inlet probes 27 may be provided within one or more of preferential flow paths 22, 24, and 26. The air inlet probes allow air or other fluids (liquids and/or gases) to be introduced into the preferential flow paths at a location spaced from the well, said fluids then being extracted through the well bore. This arrangement may be beneficial in situations where insufficient communication otherwise exists between the atmosphere and the extraction well or if the soil is incapable of yielding sufficient air flow. An extraction well 28, which will be described in greater detail shortly, is sunk in the area of the contaminated zone 12 and extends through the upper soil 18 and into the lower soil 20. Associated with the extraction well 28 is a vacuum extraction system, designated by the reference numeral 32, preferably designed to generate high vacuum conditions, typically from about 7 to about 29 inches of mercury. Gases removed by the vacuum extraction system 32 can be vented to atmosphere at 34 if within acceptable environmental limits, or further processed, such as by being incinerated or passed to a condenser, granular activated carbon filter, or other such component 36. The component 36 serves to remove contaminants from the extracted gases. Water extracted by the process can be treated by passing it through conventional systems for metals removal, volatile organic compound removal, or other steps of purification. The treated and purified water, if it is of sufficient purity at this stage, can be returned to a sewer or directly to the ground as indicated at 38. Contaminants can be stored in drums 40 for eventual destruction or further processing.

Figure 2:
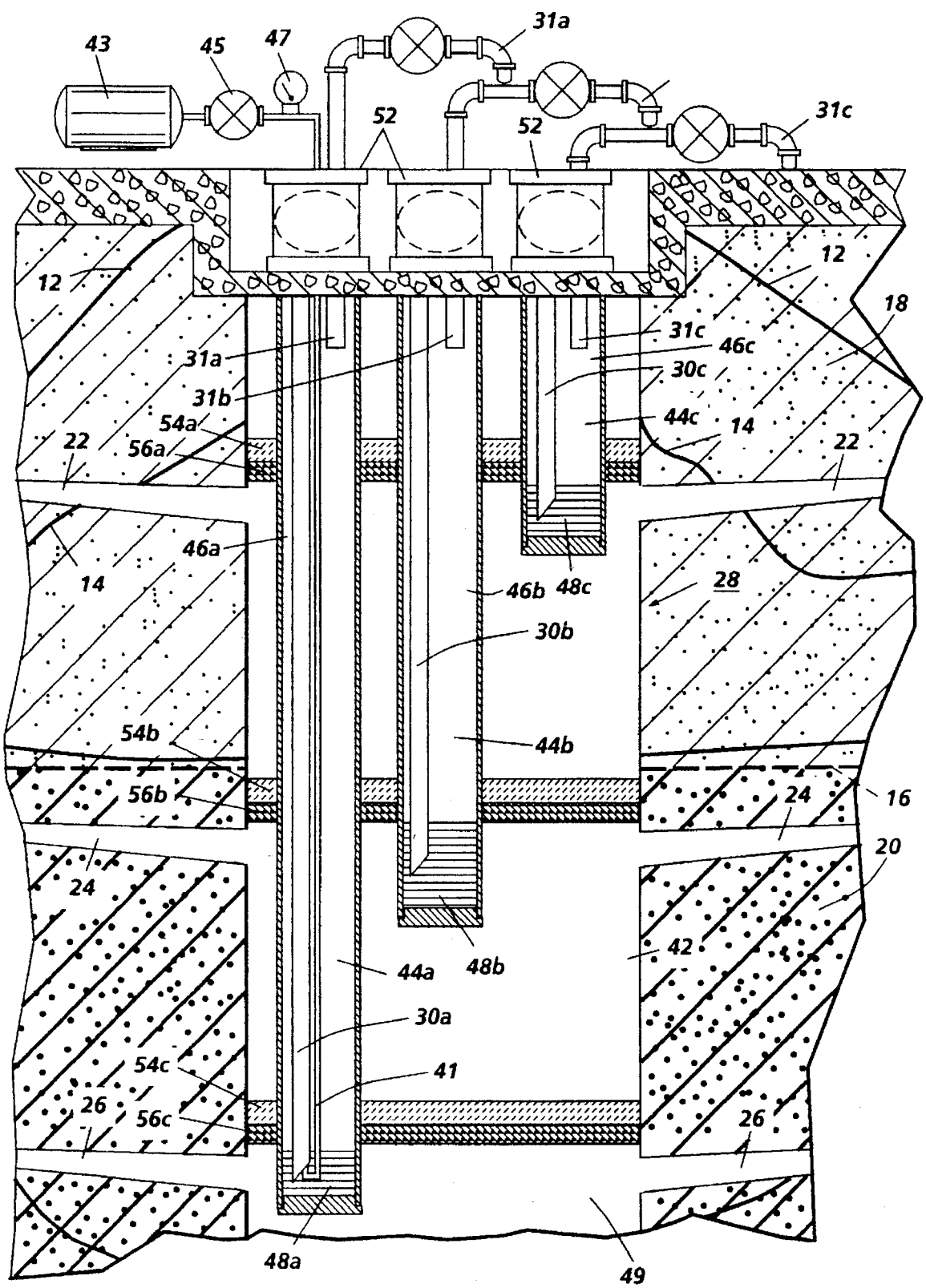

FIGS. 2, 3, and 4 (not drawn to scale) illustrate embodiments of extraction well 28 in greater detail. As illustrated schematically in FIGS. 2, 3, and 4, the extraction well 28 in the illustrated form of the invention includes an elongated borehole 42, into which are placed perforated riser pipes 44a, 44b, and 44c, each capped at the bottom. The riser pipes 44a, 44b, and 44c are perforated either above the water table, below the water table or both below and above the water table. In the embodiment illustrated, the riser pipes include an imperforate upper portion 46a, 46b, and 46c and a perforate (screened) lower portion 48a, 48b, and 48c. The riser pipes 44a, 44b, and 44c can be of any suitable material, such as polyvinyl chloride, metals, such as stainless steel, galvanized steel, or the like, plastics, including Teflon®, or the like. The screened or perforate portions can have perforations of any desired or suitable shape and size; for example, in one embodiment, the perforated portion can be equipped with 0.010 inch slots. Situated inside riser pipes 44a, 44b, and 44c are vacuum extraction pipes 30a, 30b, and 30c. The vacuum extraction pipes 30a, 30b, and 30c can be of any suitable material, such as polyvinyl chloride, metals, such as stainless steel, galvanized steel, or the like, plastics, including Teflon®, or the like. The upper ends of the riser pipes 44a, 44b, and 44c are here shown to be associated with a concrete floor or deck, and are provided with suitable pipe fittings 52, enabling the riser pipes 44a, 44b, and 44c and the vacuum extraction pipes 30a, 30b, and 30c to be coupled to the remainder of the vacuum extraction system 32 (not seen in FIGS. 2, 3, and 4), with vacuum extraction pipes 30a, 30b, and 30c being in fluid communication with the vacuum extraction system. Preferably, vacuum extraction pipes 30a, 30b, and 30c are capable of operating independently of one another. Thus, in one embodiment, vacuum is applied simultaneously to vacuum extraction pipes 30a, 30b, and 30c. In another embodiment, vacuum is applied sequentially to the pipes with, for example, vacuum being first applied only to pipe 30a, followed by application of vacuum to pipe 30b, either with or without continued application to pipe 30a, and then followed by application of vacuum to pipe 30c, either with or without continued application to pipes 30a and/or 30b. In yet another embodiment, vacuum is applied to one vacuum extraction pipe, such as 30a, for example, while a gas is introduced into another extraction pipe with an opening situated deeper in the ground than the pipe to which vacuum is applied, such as 30c for example. In still another embodiment, vacuum is applied to one vacuum extraction pipe, such as 30c, for example, while a gas is introduced into another extraction pipe with an opening situated at a shallower level in the ground than the pipe to which vacuum is applied, such as 30a for example. Any other combination of application of vacuum, positive pressure, or neither to the plurality of pipes in the well is also possible.

Vacuum extraction pipes 30a, 30b, and 30c all have bottom openings within extraction well 28. Each vacuum extraction pipe is situated so that its bottom opening is within a preferential flow path. For example, as shown in FIG. 2, vacuum extraction pipe 30a is situated within preferential flow path 26, vacuum extraction pipe 30b is situated within preferential flow path 24, and vacuum extraction pipe 30c is situated within preferential flow path 22. The preferential flow paths 22, 24, and 26 and the bottom openings of vacuum extraction pipes 30a, 30b, and 30c are isolated from each other by layers of relatively impermeable soil or rock and, within the borehole, by essentially impermeable seals surrounding the impermeable portions 46a, 46b, and 46c of riser pipes 44a, 44b, and 44c. For example, as illustrated in FIG. 2, the bottom opening of vacuum extraction pipe 30c is isolated within preferential flow path 22 by grout layers 54a and 54b and by bentonite cement layers 56a and 56b. The bottom opening of vacuum extraction pipe 30b is isolated within preferential flow path 24 by grout layers 54b and 54c and by bentonite cement layers 56b and 56c. The bottom opening of vacuum extraction pipe 30a is isolated within preferential flow path 26 by grout layer 54c and bentonite cement layer 56c and by the bottom of borehole 42. Sand 49 situated within the borehole 42 supports the bentonite cement and grout layers within the borehole and riser pipe. Any other suitable or desired materials can also be employed for isolating the preferential flow paths from each other, such as other grouts, bentonite clays, nonshrink epoxy materials, hydraulic cements, plastics, rubber materials, or the like.

While not necessary, it is preferred that the bottoms of vacuum extraction pipes 30a, 30b, and 30c terminate at an angle other than exact parallel with the horizontal; by terminating the pipe at an angle, the surface area of the opening is increased, which enhances the ease of starting the well. Preferred angles for the bottom opening of vacuum extraction pipes 30a, 30b, and 30c are from about 10° to about 80° with respect to the horizontal, and more preferably about 45° with respect to the horizontal, although the angulation can be outside this range.

In one embodiment of the present invention, situated at the end of extraction well 28 at or near the ground surface are one or more optional air inlets 31 associated with at least one riser pipe, said optional inlet 31 preferably being equipped with an air flow gauge (not shown), which permits the introduction of air at any desired pressure, including reduced pressures, atmospheric pressure, or increased or forced pressures, into riser pipes 44a, 44b, and/or 44c; preferably, separate connections enable introduction of air selectively into at least one but not others of 44a, 44b, and 44c. As shown, inlet 31a permits introduction of air into riser pipe 44a, inlet 31b permits introduction of air into riser pipe 44b, and inlet 31c permits introduction of air into riser pipe 44c. When it is desired to add air at pressures greater than atmospheric pressure, air pressure can be provided by an additional pump (not shown), by connecting the outlet or exhaust of the vacuum pump connected to vacuum extraction pipes 30a, 30b, and/or 30c to an air inlet, or the like. The air flow rate through an air inlet can range from nearly zero to any value less than the CFM rated capacity of the vacuum pump connected to vacuum extraction pipes 30a, 30b, and 30c. While some air flow may be desirable at system start-up, after the process has been in operation for a period of time, the air flow may in some instances be reduced to zero, with no air being introduced into the well through the air inlet or inlets and maximum vacuum being applied to the sub-surface soil and water. In addition, the air introduced through the air inlet or inlets can, if desired, be heated to improve the extraction of some contaminants. Further, the air inlet or inlets can be used as an inlet for introducing other materials or chemicals into the riser pipe and extraction stream, since chemicals or materials so introduced will pass down with the inlet air through the riser pipe to the bottom thereof, and then back up with the water and air mixture through vacuum extraction pipe 30, thus chemically or otherwise interacting with the water and air mixture. For example, oxidizers or surfactants or other chemicals can be introduced for the treatment of water-borne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, gas inlet or inlets can be employed to introduce into the vacuum extraction pipe nutrients for biotransformation, such as cellulose or the like, or for introducing nitrogen to enhance anaerobic processes or oxygen to enhance aerobic processes. These materials can also be added through one or more of the vacuum extraction pipes 30a, 30b, or 30c or through one or more of the air inlet probes 27. Further information regarding biological processes for treating soil contaminants is disclosed in, for example, W. K. Ahlert et al., "In situ Bioremediation of Soil Contaminated With Methyl Benzene Species," M. A. Franson, "In Situ Bioremediation of Unleaded Gasoline Contaminated Ground Water, Plainfield, Conn., A Case Study," and M. Leavitt et al., "Implications of Surfactant Augmentation for In Situ Bioremediation Systems," all contained in *In Situ Treatment of Contaminated Soil and Water*, Proceedings of the 1992 U.S. EPA/A & WMA International Symposium, Air and Waste Management Association (Pittsburgh 1992); and *Subsurface Restoration Conference*, Jun. 21–24, 1992, Dallas, Tex. (Rice University Dept. of Envi. Sci. & Eng., Houston Tex. 1992); the disclosures of each of which are totally incorporated herein by reference.

Liquid drawn up through vacuum extraction pipes 30a, 30b, and 30c preferably, although not necessarily, is in two-phase form, namely droplets, mist, and/or vapor entrained in liquid, as opposed to slug flow. Air flow through the system is provided by one or more of the following: air from the unsaturated (vadose) zone; air from the dewatered saturated zone; air from one or more of the optional air inlet mechanisms 31, at reduced pressures, atmospheric pressure, or forced pressures; air from optional gas inlet or inlets 41 at atmospheric pressure or forced pressures; and air introduced through one preferential flow path (through either an air inlet probe 27 or through a vacuum extraction pipe 30) and extracted from another preferential flow path. Thus, it is not required that air be extracted from the ground in the vicinity of the extraction well. Generally, a high vapor/air velocity is maintained through the system. Air velocity in the vacuum extraction pipe should be sufficient to carry or lift water in the vapor phase, either droplets of various sizes, or the like, entrained in the air. Air velocity values in the range of from about 1 foot per second to about 200 feet per second or greater generally suffice.

Vacuum extraction pipes 30a, 30b, and/or 30c each can optionally be equipped with at least one gas inlet 41. As illustrated in FIG. 2, vacuum extraction pipe 30c is equipped with a single optional gas inlet 41. As illustrated schematically in FIG. 3, in which, for the sake of simplicity, only a single vacuum extraction pipe 30 is shown (although in actual operation at least two riser pipes containing vacuum extraction pipes would be situated in borehole 42), the vacuum extraction pipe 30 is equipped with three optional gas inlet tubes 41a, 41b, and 41c. As illustrated schematically in FIG. 4, vacuum extraction pipe 30 is equipped with three optional gas inlets 41d, 41e, and 41f, all feeding from a single gas inlet tube 41.

More specifically, as shown in FIG. 2, optional gas inlet 41 enters vacuum extraction pipe 30 from the bottom opening of vacuum extraction pipe 30. Alternatively (not shown), gas inlet 41 can enter vacuum extraction pipe 30 through an opening in the side of vacuum extraction pipe 30. Gas inlet 41 is in fluid communication with a gas supply, which can be either atmospheric air or some other desired gas, and with optional air compressor 43. A tank containing compressed air can also serve as the gas supply. The gas supply to gas inlet 41 is controlled through valve 45 and the pressure in gas inlet 41, if desired, can be monitored with optional pressure gauge 47. In addition, if desired, an automatic controller for turning valve 45 on and off and/or for controlling the duration and/or pressure of the gas applied to vacuum extraction pipe 30 from gas inlet 41 can be added to the configuration of gas inlet 41.

As shown in FIG. 3, optional gas inlets 41a, 41b, and 41c enter vacuum extraction pipe 30 through openings in the sides of vacuum extraction pipe 30. Gas inlet 41b can be situated above, at, near, or below the level of the water table (and correspondingly above, at, near, or below the approximate level of groundwater which has entered vacuum extraction pipe 30 prior to initiation of the pumping process). Gas inlet 41a is generally situated at a level below the natural water table but above the level to which the groundwater drops after the pumping process has been in operation for a period of time. Gas inlet 41c is situated at a level below the level to which the groundwater drops after the pumping process has been in operation for a period of time. While gas inlet 41c is shown in this illustration as entering vacuum extraction pipe 30 through an opening in the side wall of vacuum extraction pipe 30 immediately above the bottom opening of vacuum extraction pipe 30, gas inlet 41c may also enter vacuum extraction pipe 30 either directly through the bottom opening of vacuum extraction pipe 30 or through either side of vacuum extraction pipe 30. The number of optional gas inlets in this embodiment of the invention is not limited to two or three; for example, in a well 200 feet deep, a greater number of gas inlets may be desired. In addition, the optional gas inlet openings into vacuum extraction pipe 30 need not be evenly spaced with respect to each other; the length of each gas inlet may vary as desired for optimal operation of the well. Gas inlets 41a, 41b, and 41c are each in fluid communication with gas supplies, which can be either atmospheric air or some other desired gas, and with optional air compressors 43a, 43b, and 43c. Tanks containing compressed air can also serve as the gas supplies. The gas supplies to gas inlets 41a, 41b, and 41c are each controlled through valves 45a, 45b, and 45c, and the pressures in gas inlets 41a, 41b, and 41c, if desired, can be monitored with optional pressure gauges 47a, 47b, and 47c. In addition, if desired, an automatic controller for turning valves 45a, 45b, and 45c on and off and/or for controlling the duration and/or pressure of the gas applied to vacuum extraction pipe 30 from gas inlets 41a, 41b, and 41c can be added to the configuration of gas inlets 41a, 41b, and 41c.

As shown in FIG. 4, in which, for the sake of simplicity, only a single vacuum extraction pipe 30 is shown (although in actual operation at least two vacuum extraction pipes would be situated in borehole 42), optional gas inlets 41d, 41e, and 41f enter vacuum extraction pipe 30 through openings in vacuum extraction pipe 30. Gas inlets 41d, 41e, and 41f are all in fluid communication with main gas inlet 41. The diameter of gas inlet 41d, situated closest to the top of vacuum extraction pipe 30, is smaller than the diameter of gas inlet 41e situated between gas inlets 41d and 41f. The diameter of gas inlet 41e is smaller than the diameter of gas inlet 41f situated closest to the bottom opening of vacuum extraction pipe 30. Gas inlet 41d can be situated above, at, near, or below the level of the water table (and also correspondingly above, at, near, or below the approximate level of groundwater which has entered vacuum extraction pipe 30 prior to initiation of the pumping process). Gas inlet 41e is generally situated at a level below the natural water table but above the level to which the groundwater drops after the pumping process has been in operation for a period of time. Gas inlet 41f is situated at a level below the level to which the groundwater drops after the pumping process has been in operation for a period of time. While gas inlet 41f is shown in this illustration as entering vacuum extraction pipe 30 through an opening in the side wall of vacuum extraction pipe 30 immediately above the bottom opening of vacuum extraction pipe 30; gas inlet 41f may also enter vacuum extraction pipe 30 either directly through the bottom opening of vacuum extraction pipe 30 or through either side of vacuum extraction pipe 30. The number of optional gas inlets in this embodiment of the invention is not limited to two or three; for example, in a well 200 feet deep, a greater number of gas inlets may be desired. In addition, the optional gas inlet openings into vacuum extraction pipe 30 need not be evenly spaced with respect to each other; the distances between gas inlets may vary as desired for optimal operation of the well. The gas supply to gas inlet 41 is controlled through valve 45 and the pressure in gas inlet 41, if desired, can be monitored with optional pressure gauge 47. In addition, if desired; an automatic controller for turning valve 45 on and off and/or for controlling the duration and/or pressure of the gas applied to vacuum extraction pipe 30 from gas inlet 41 can be added to the configuration of gas inlet 41. The relative diameters of gas inlet openings 41d, 41e, and 41f are selected so that when compressed air is applied to gas inlet 41, the compressed air will preferentially be directed first to 41d, followed by 41e, and then followed by 41f, thus resulting in the top, middle, and bottom sections of the vacuum extraction pipe being started in sequence. The opening of smallest diameter, 41d, is situated at the top and the opening of largest diameter, 41f, is situated at the bottom because more compressed air is needed to overcome the effect of the head due to the depth of the well and the length of the extraction tube needed to start the system.

In operation, gas is introduced into vacuum extraction pipe 30 either before, while, or after a vacuum is applied to vacuum extraction pipe 30 to initiate two-phase flow within vacuum extraction pipe 30. In the embodiment wherein vacuum extraction pipe 30 is equipped with a single gas inlet 41 as illustrated in FIG. 2, gas is applied through gas inlet 41 continuously as vacuum is applied to vacuum extraction pipe 30 until two-phase flow is established within vacuum extraction pipe 30, at which point the flow of gas through gas inlet 41 is halted. The actual duration for application of gas through gas inlet 41 will vary depending on factors such as the depth of the well, the depth within the well of the gas inlet 41, the depth of groundwater contained within vacuum extraction pipe 30, the dimensions of the well, vacuum extraction pipe 30, and gas inlet 41, the pressure of gas applied through gas inlet 41, and the like. Typical duration times for wells 4 inches in diameter and wherein gas is introduced at a pressure of from about 20 to about 60 pounds per square inch are from about 15 to about 20 seconds when the groundwater level is less than 15 feet deep and about 45 seconds when the groundwater level is from about 18 to about 25 feet deep. In some instances, durations for applying gas through gas inlet 41 may be 5 minutes or greater.

In embodiments of the present invention wherein vacuum extraction pipes 30a, 30b, and/or 30c are equipped with a multiplicity of gas inlets, as illustrated in FIG. 3 for example, gas is typically applied first through uppermost gas inlet 41b continuously as vacuum is applied to vacuum extraction pipe 30 until two-phase flow is established within vacuum extraction pipe 30 from the depth of gas inlet 41b. At this point, the flow of gas through the inlet next in depth, which in FIG. 3 is gas inlet 41a, is initiated and maintained until two-phase flow is established within vacuum extraction pipe 30 from the depth of gas inlet 41a. Subsequently, the flow of gas through the inlet next in depth, which in FIG. 3 is gas inlet 41c, is initiated and maintained until two-phase flow is established within vacuum extraction pipe 30 from the depth of gas inlet 41c. The flow of gas through each inlet can be terminated once two-phase flow is established from that depth, although it is preferred to maintain at least some overlap between the flow of gas through one inlet and the flow of gas through the inlet next in depth to ensure that two-phase flow does not cease in the vacuum extraction pipe at any time. For example, in a particular well, gas might be introduced first through uppermost gas inlet 41b for a period of about 10 seconds, after which two-phase flow is established within the vacuum extraction tube from the depth of gas inlet 41b, followed by maintaining gas flow through gas inlet 41b while also permitting gas to flow through gas inlet 41a for a period of about 5 seconds, followed by terminating the flow through gas inlet 41b while allowing gas to continue to flow through gas inlet 41a for a period of 15 seconds, after which two-phase flow is established within the vacuum extraction tube from the depth of gas inlet 41a, followed by maintaining gas flow through gas inlet 41a while also permitting gas to flow through gas inlet 41c for a period of about 5 seconds, followed by terminating the flow through gas inlet 41a while allowing gas to continue to flow through gas inlet 41c for a period of 20 seconds, after which two-phase flow is established within the vacuum extraction tube from the depth of gas inlet 41c, followed by terminating the flow through gas inlet 41c. The duration of flow through each inlet and the duration of overlap for flow from two or more inlets will vary with each well. It is also possible, however, to initiate flow through each inlet sequentially, with no overlap between the flow through one inlet and the flow through another inlet, or to initiate flow in multiple inlets in some order other than sequentially by increasing depth. Further, flow through multiple gas inlets can be initiated simultaneously. If desired, the flow duration through each gas inlet can be controlled automatically by running each gas inlet 41a, 41b, and 41c through a timer control system.

Generally, flow through the gas inlet or inlets is ceased once the two-phase vacuum extraction process has been successfully initiated. At various times in the extraction process, however, the flow through vacuum extraction pipes 30a, 30b, and/or 30c may vary from the desired two-phase flow to some other form of flow, such as slug flow. At these times, gas may also be introduced through gas inlet or inlets 41 to convert the flow in the vacuum extraction pipe 30 back to the desired two-phase form.

The gas inlet or inlets can be of any suitable configuration, with a few examples of suitable configurations being illustrated schematically (and not necessarily to scale) in FIGS. 5, 6, and 7. As illustrated schematically in FIG. 5, gas inlet 41a enters vacuum extraction pipe 30 through an opening in the side of vacuum extraction pipe 30 and terminates at an approximate right angle to the wall of vacuum extraction pipe 30. While not required, it is preferred that the opening of gas inlet 41a be situated in relative close proximity to the inner wall of vacuum extraction pipe 30 to minimize frictional forces as air 51 is introduced into vacuum extraction pipe 30 through gas inlet 41a to initiate two-phase flow of gas 53 and liquid 55 in vacuum extraction pipe 30.

As illustrated schematically in FIG. 6, gas inlet 41a' enters vacuum extraction pipe 30 through an opening in the side of vacuum extraction pipe 30 and terminates at an approximate parallel angle to the wall of vacuum extraction pipe 30. While not required, it is preferred that the opening of gas inlet 41a' be situated in relative close proximity to the inner wall of vacuum extraction pipe 30 to minimize frictional forces as air 51 is introduced into vacuum extraction pipe 30 through gas inlet 41a' to initiate two-phase flow of gas 53 and liquid 55 in vacuum extraction pipe 30.

As illustrated schematically in FIG. 7, gas inlet 41c enters vacuum extraction pipe 30 through the bottom opening of vacuum extraction pipe 30 and terminates at an approximate parallel angle to the wall of vacuum extraction pipe 30. While not required, it is preferred that the opening of gas inlet 41c be situated in relative close proximity to the inner wall of vacuum extraction pipe 30 to minimize frictional forces as air 51 is introduced into vacuum extraction pipe 30 through gas inlet 41c to initiate two-phase flow of gas 53 and liquid 55 in vacuum extraction pipe 30.

The optional gas inlet or inlets 41 can be either flexible or rigid, and can be of any suitable material, such as polymers and plastics, including polyvinyl chloride, Teflon®, polyethylene, polypropylene, or the like, metals, such as stainless steel, galvanized steel, copper, brass, or the like, or any other suitable material. The gas inlet or inlets 41 can be of any desired or suitable dimensions to enable the desired rate of flow through the vacuum extraction pipe, and typically will vary depending on the dimensions of the vacuum extraction pipe, the depth of the well, the nature of the packing around the well, and the like.

Any desired pressure can be employed for the gas introduced into vacuum extraction pipe 30 through gas inlet or inlets 41. Typical pressures range from atmospheric pressure outside the well (in which case no air compressor is required) to about 100 pounds per square inch, with preferred pressures being from about 20 to about 60 pounds per square inch, more preferably from about 30 to about 50 pounds per square inch, although the pressure can be outside these ranges. Greater pressures initiate two-phase flow within the vacuum extraction pipe more rapidly, and may also be more desirable at greater relative depths of water (with relative depth in this instance referring to the difference in depth between the gas inlet and the groundwater level within the vacuum extraction pipe).

Any desired gas can be introduced into the vacuum extraction pipe through the optional gas inlet or inlets. Ambient air may be selected as the most inexpensive gas. In addition, the air introduced through gas inlet or inlets 41 can, if desired, be heated to improve the extraction of some contaminants. Further, gas inlet or inlets 41 can be used as an inlet for introducing other materials or chemicals into the riser pipe and extraction stream for chemically or otherwise interacting with the water and air mixture. For example, oxidizers or surfactants or other chemicals can be introduced for the treatment of water-borne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, the gas inlet or inlets can be employed to introduce into the vacuum extraction pipe nutrients for biotransformation, such as cellulose or the like, or for introducing nitrogen to enhance anaerobic processes or oxygen to enhance aerobic processes.

Returning to FIGS. 2, 3, and 4, the upper portions 46 of the riser pipes 44 are surrounded by a low permeability grout, such as bentonite cement 54a, and below the grout 54a by a bentonite seal 56a. Additional layer of grout 54b and additional layer of bentonite cement 56b isolate the terminal ends of vacuum extraction pipe 30c and vacuum extraction pipe 30b, thus also isolating fracture 22 from fracture 24. Additional layer of grout 54c and additional layer of bentonite cement 56c isolate the terminal ends of vacuum extraction pipe 30b and vacuum extraction pipe 30a, thus also isolating fracture 24 from fracture 26. Relatively low permeability sand 49 is situated within borehole 42 and riser pipe 44 between the grout and bentonite layers to support the grout and bentonite layers within the borehole and riser pipe. Sand 49 preferably is also contained within fractures 22, 24, and 26 to prevent collapse of the fractures. The area within the borehole 42 surrounding the slotted lower portions 48 of the riser pipes 44 and part of the upper portions 46 above the slotted lower portions 48 is packed with fine screened sand 49, to facilitate the flow of gas and liquid from the surrounding soil into the riser pipes 44.

FIG. 8 (not drawn to scale) illustrates schematically in greater detail one example of a vacuum extraction system 32 and steps and apparatus for treating extracted material. A vacuum pump 78, driven by electric motor 80, is in fluid communication through a pipe 82, knock-out pot 84 and pipe 86 with the pipe fitting 52 of extraction well 28. The knock-out pot 84 can be of conventional design, familiar to those skilled in the art.

The knock-out pot 84 serves to separate the two phases emerging from the extraction well 28, enabling them to be subjected to appropriate further processing. In this regard, a pipe 88 is provided in association with the knock-out pot 84, to conduct effluent in the liquid phase through filtration and stripping steps. Filtration is provided in the illustrated embodiment by parallel filters 90 and 92 which can alternately or simultaneously be used in a conventional manner. Cut-off valves, omitted in the drawings for clarity, permit either filter 90 or 92 to be isolated and each filter to be removed, cleaned, or replaced. Suitable pressure gauges (not shown) can be placed on the suction and discharge sides of the filters 90 and 92 to indicate filter loading. Examples of suitable filters 90 and 92 include SQ micron nylon filters, sold by Rosedale Products, Incorporated, capable of passing 222 gpm at 150 psi. Other separation techniques and apparatus can also be used.

A pump 94, for erosion resistance preferably of the single stage progressive cavity type, serves to draw off the liquid phase effluent of the knock-out pot 84. An example of a suitable pump is sold by the Nemo Pump Division of Netzsch Incorporated, of Exton, Pa., Model Ne-30A. Here, too, other suitable apparatus can be used.

In the illustrated embodiment, the liquid phase is fed from the pump 94 through filters 90 and/or 92 to a pipe 96 leading to an optional air stripper assembly 98, the function of which is to remove from the effluent volatile organic compounds. An optional blower 100 associated with the optional air stripper assembly 98 delivers a flow of warm air through the housing of the air stripper assembly 98, carrying off the volatile organic compounds through the vent 102 to atmosphere or further processing (not shown). An optional transfer pump 104, discharging to a pipe 106, serves to transport liquid from the sump of the air stripper assembly 98 for further processing. The transfer pump 104 can be turned off in response to a low level switch 108 associated with the air stripper assembly 98. A high level switch 110 associated with the air stripper assembly 98 controls the pump 94 in response to high water level in the air stripper assembly 98. The air stripper assembly 98 can be a conventional "off-the-shelf" unit, familiar to those skilled in the art.

The optional air stripper assembly 98 can, if desired, be omitted, and the effluent of the pipe 96 joined with the effluent of the pipe 120. It is hypothesized that the intimate mixing of the air and water during extraction (at which time groundwater is extracted in an air stream under vacuum) allows the volatile compounds to come out of solution, thus obviating the need for later air stripping.

Avoidance of the need for an air stripper assembly 98 also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

As indicated above, under the influence of the vacuum pump 78 the vapors separated from the two-phase effluent from the extraction well 28 are drawn to vacuum pump 78. In the illustrated embodiment of the invention, the vacuum pump 78 is of the liquid ring type, and is provided with a make up water line 112, served by a domestic supply. The make up water line 112 is provided with a solenoid actuated valve 114 responsive to the high water level switch 110 of air stripper assembly 98.

The pump 78 exhausts to a vapor/liquid separator 116, the vapor effluent of which is conducted to atmosphere, or if appropriate to further processing through a pipe 118. The bulk of the liquid effluent from the vapor liquid separator 116 passes through a pipe 120 to a sump 122, where it joins the effluent of the pipe 106, the liquid output of the air stripper assembly 98. A fraction or all of the liquid effluent of the vapor liquid separator 116 can be drawn off through a line 124 to join the flow in the make up water line 112 servicing the liquid ring pump 78.

An optional pump 126, controlled by a low level cut-off switch 128, draws liquid from optional sump 122 and propels it through a pipe 130 for further processing. In the illustrated embodiment, the liquid is passed in two stages through canisters 132 and 134 containing granular activated carbon. Other contaminant removal steps or techniques can be used. The treated water emerges through a pipe 136 and is of sufficient purity to allow its return to the soil or a sewer without further treatment.

FIGS. 9, 10, 11, and 12 (not drawn to scale) illustrate schematically the steps and apparatus for another method for treating soil liquids and gases containing contaminants. A vacuum inducing device 201, driven by electric motor 203, is in fluid communication through a pipe 205, vapor-liquid phase separator such as a knock-out pot 207, and pipe 209 with the pipe fitting 211 to one or more extraction wells 213. The knockout pot 207 can be of conventional design, familiar to those skilled in the art, such as those fabricated or supplied by Burgess Manning, Anderson Separator, or the like. The vacuum inducing device 201 can be of any conventional design, such as a centrifugal blower, a vane type blower, a rotary blower, a liquid ring vacuum pump, or the like.

The knock-out pot 207 serves to separate mechanically the two phases emerging from the extraction well 213, enabling them to be subjected to appropriate further processing. In this regard, a pipe 215 is provided in association with the knock-out pot 207, to conduct effluent in the liquid phase to a pump 221 and then through optional filtration and, if desired, stripping steps. Optional filtration is provided in the embodiment illustrated in FIGS. 10, 11, and 12 by parallel filters 217 and 219 which can alternately or simultaneously be used in a conventional manner. Cut-off valves, omitted in the drawings for clarity, permit either filter 217 or 219 to be isolated and each filter to be removed, cleaned, or replaced. Suitable pressure gauges (not shown) can be placed on the inlet and discharge sides of the filters 217 and 219 to indicate filter loading. Examples of suitable filters 217 and 219 include cartridge or bag type filters as supplied by Cuno, Incorporated, Rosedale Products, Incorporated, 3M Filtration Products, Ronningen-Petter Filters, or the like. Other separation techniques and apparatus can also be used.

A transfer pump 221 serves to deliver the liquid phase effluent of the knock-out pot 207 to treatment. Examples of suitable transfer pumps include progressive cavity pumps or centrifugal pumps, as supplied by Robbins Meyers, Incorporated, Price Pump Company, Crane-Deming Pumps, Goulds Pumps Company, or the like. Other similar apparatus can also be used.

From optional filters 217 and 219, the liquid stream is routed for further processing, generally designated 248 in FIGS. 9, 10, and 11. Examples of suitable processing to remove contaminants, if present in the liquid phase, include carbon adsorption, advanced oxidation, biological treatment, resin adsorption, or the like. In the embodiment illustrated in FIG. 12, the liquid is passed in two stages through canisters 247 and 249 containing granular activated carbon, such as that available from Carbtrol Corporation, Envirotrol, or the like. Other contaminant removal steps or techniques can also be used. Final liquid phase effluent is delivered through pipe 251 to an appropriate discharge point.

As indicated above, under the influence of the vacuum inducing device 201 vapors separated from the two-phase effluent from the extraction well 213 are drawn to vacuum inducing device 201. In the embodiment of the invention illustrated in FIGS. 10 and 12, the vacuum inducing device 201 is a liquid ring vacuum pump. Examples of suitable commercially available liquid ring vacuum pumps include those available from Intervac Corporation, Sihi Pumps, Nash Engineering, or the like. The liquid ring pump employs a seal liquid which acts as a sealant of the vacuum and which also acts as a recirculating coolant for the pump. For the present invention, while water is a suitable seal liquid, a relatively low vapor pressure liquid is the preferred seal liquid. Examples of preferred seal liquids include mineral oils, turbine oils, and the like. One preferred seal liquid is SAE 10 oil, such as those products available from Mobil Oil, Quaker State, or the like. Another example of a preferred seal liquid is the hydrotreated, highly refined, dewaxed paraffinic oil CP-9001-22 available from Intervac Corporation, Victor, N.Y. The seal liquid preferably exhibits little or no volatility at the maximum operating temperature of the pump. Preferably, the seal liquid has a vapor pressure of less than about 25 mm Hg at the maximum operating temperature of the pump. The specific seal liquid selected may depend on considerations such as compatibility of the seal liquid with the specific organic contaminants expected to be recovered from the ground (preferably, the specific contaminants present are not highly soluble in the seal liquid), the temperature range at which the pump will be operated (preferably, the seal liquid does not volatilize or decompose at the pump operating temperatures, which typically are from about 50° to about 400° F., more typically from about 140° to about 250° F., and preferably from about 160° to about 185° F.), the viscosity of the seal liquid at both the projected operating temperature and the start-up temperature, and the like.

When a liquid ring vacuum pump is employed, as illustrated in FIGS. 10 and 12, the pump exhausts to an air-seal liquid separator 257, the vapor effluent of which is conducted to further processing through a pipe 259. The bulk of the seal liquid effluent from the air-seal liquid separator 257 is drawn off through a line 261 to join the flow in the seal liquid line servicing the liquid ring pump. The air-seal liquid separator 257 can be of any suitable or conventional design for coalescing of seal liquid mist and the gas stream. Examples of suitable coalescing mist elements include those available from Technolab, Osmonics, MechanEquip, or the like. The seal liquid exits the air-seal liquid separator 257 through pipe 261 to the seal liquid circulation pump 283. The circulation pump 283 can be of any suitable or conventional design, such as centrifugal pumps available from Price Pump Company, Goulds Pumps Company, Burks Pumps, or the like. Heat is transferred from the seal liquid stream to the vapor stream by heater 277. The seal liquid stream is then returned to the liquid ring vacuum pump.

Subsequent to passing through the pump (and the air-seal liquid separator in FIGS. 10 and 12), the vapor stream is conducted through pipe 259 to a cooling system, generally designated 262 in FIG. 9. Any desired method may be employed for cooling the gaseous stream. For example, as illustrated in FIG. 10, the vapor stream first passes through after-cooler 264, which in the illustrated embodiment is an air-to-air heat exchanger. As shown in FIG. 10, the vapor stream passes from after-cooler 264 through condenser 263, an air-to-liquid heat exchanger which, in the illustrated embodiment is cooled by a jacket 265 of water from the liquid phase treatment process which enters jacket 265 through line 267 and exits jacket 265 through line 269. Examples of suitable air-to-air and air-to-liquid heat exchangers include those supplied by Airtek, Thermal Transfer Products, Ltd., Liebert Corporation, Bell and Gossett, or the like. While not required, in the embodiment illustrated in FIG. 10, it is preferred that the water enter jacket 265 subsequent to passing through filters 217 and 219 to minimize deposits of contaminants in jacket 265. If desired, however, the coolant in condenser jacket 265 can also be supplied from another source, such as an outside water supply, a recirculating coolant system, or the like. In another embodiment, as shown in FIG. 11, the vapor stream passes from pipe 259 to air-to-air heat exchanger 264, where the vapor stream is cooled and then conveyed to condensate separator 271. In yet another embodiment, as shown in FIG. 12, the vapor stream passes directly from pipe 259 exiting air-seal liquid separator 257 into condenser 263, which, in the illustrated embodiment, is cooled by a jacket 265 of water from a water supply which enters jacket 265 through line 267 and exits jacket 265 through line 269. Cooling system 262 may include any other suitable cooling methods, and is not limited to air-to-air heat exchangers or air-to-liquid heat exchangers.

The vapor and condensed liquid from cooling system 262 then enter condensate separator 271, where condensed liquid exits condensate separator 271 through pipe 273 and is conducted to the water treatment system at knock-out pot 207. Examples of suitable condensate separators include those available from Burgess Manning, Incorporated, Anderson Separator, or the like. Optionally, if desired, (not shown) condensate separator 271 can be equipped with multiple outlets to facilitate separation of water and liquid contaminants which have either a higher or lower specific gravity than water. An outlet situated at the bottom of condensate separator 271 enables draining of liquid contaminants with a specific gravity higher than that of water, and an outlet situated at or near the liquid level within condensate separator 271 enables draining of liquid contaminants with a specific gravity lower than that of water, in each instance permitting removal of the liquid contaminant from the condensate separator 271 prior to draining of the water.

Typically, as illustrated in FIGS. 9 through 12, the vapor stream passing through the cooling system (262 in FIG. 9, 263 and 264 in FIG. 10, 263 in FIG. 12, 264 in FIG. 11) is cooled from initial temperatures of from about 100° to about 400° F. to temperatures of from about 40° to about 100° F., more typically from about 60° to about 80° F. when water from the liquid stream is employed as the coolant as illustrated in FIG. 10, and to temperatures of from about 40° to about 60° F. when other cooling methods are employed, although the temperature can be varied as desired.

The vapor stream exiting condensate separator 271 is then heated in heater 275. Heater 275 employs the mechanical and compression heat generated by the vacuum inducing device 201, either as direct heating using discharge gases (for non-liquid sealed pumps) or heat recovery from circulating seal liquid (for liquid ring pumps), conveyed from vacuum inducing device 201 to heater 275 through a conduit 279 and either returned to vacuum inducing device 201 or otherwise disposed of through a conduit 281. For example, as illustrated in FIGS. 10 and 12, heater 275 provides heat via a jacket 277 of seal liquid from the liquid ring pump recirculating seal liquid system. Seal liquid enters jacket 277 through line 279, which conveys the seal liquid from the main seal liquid circulation system of the pump, and exits jacket 277 through line 281, which conveys the seal liquid back to the main seal liquid circulation system of the pump. Seal liquid in the recirculation stream is circulated by seal liquid circulation pump 283 and, if necessary, prior to re-entering pump 201, passes through air-seal liquid heat exchanger 285, where the seal liquid is cooled. Air-seal liquid heat exchanger 285 can be any suitable or desired arrangement for cooling the seal liquid, such as an air-to-air heat exchanger, an air-to-liquid heat exchanger, or any other suitable cooling apparatus. As illustrated in FIG. 11, when a non-liquid-seal pump, such as a rotary blower, is employed, heat is supplied to heater 275 by directing at least some of the exhaust vapors from the pump through conduit 279. The heated gases exit jacket 277 through line 281, and can either be directed back to pump 201 or vented to the atmosphere. Examples of suitable apparatus for heater 277 include heat transfer devices available from, for example, Thermal Transfer Products, Liebert Corporation, Bell and Gossett, or the like. Other heat transfer techniques and apparatus can also be used.

The vapor stream is heated to the desired temperature for further processing at heater 275; typically, this temperature is within the optimum range of temperatures for obtaining maximum efficiency with final vapor treatment processes. For example, when the vapor stream is subsequently treated with carbon filters, heater 275 typically heats the vapor stream to a temperature of from about 40° to about 140° F., more typically from about 50° to about 110° F., and preferably from about 60° to about 70° F., although the temperature can be outside these ranges. The vapor stream then enters the subsequent treatment system 287, where additional vapor phase contaminants are removed, and is vented to the atmosphere at exit 289. The treatment system 287 can be any desired method for removing contaminants from the gaseous stream, such as, for example, a carbon filtration system or other carbon adsorption device, a thermal oxidation system, a catalytic oxidation system, a biological treatment system, a resin adsorption system, or any other final treatment system appropriate for the contaminants of concern. As illustrated in FIG. 12, the treatment method is by carbon adsorption using granular activated carbon, such as that available from Carbtrol Corporation, Envirotrol, or the like.

FIG. 13 (not drawn to scale) illustrates schematically an example of an optional air inlet probe 27. The air inlet probe 27 comprises a borehole 58, which receives a pipe 60. The pipe 60 in one operative embodiment comprises a four inch diameter PVC pipe, capped at the bottom, and having a screen of 0.010 inch slots. The pipe 60 is surrounded at its upper end by a cement collar or bentonite seal 62, extending to the ground surface 64. Any suitable valve 68 can be provided in association with the air inlet probe 27 to open or close the air injection probe as desired. Surrounding a medial portion 70 of the pipe 60 within the borehole 58 is a bentonite slurry 72, which provides a gas-tight seal between the pipe 60 and the borehole 58. The slotted lower portion 74 of the pipe 60 is surrounded by gas-permeable packed sand 76. As will now be apparent, the pipe 60 facilitates the injection of air into a preferential flow path (preferential flow path 22 shown in this Figure).

Other embodiments and modifications of the present invention may occur to those skilled in the art subsequent to a review of the information presented herein; these embodiments and modifications, as well as equivalents thereof, are also included within the scope of this invention.

What is claimed is:

1. A process which takes place at substantially ambient temperature for removing contaminants from a contaminated area of the ground comprising soil having a first permeability, said ground having a plurality of paths of preferential flow, each path having a permeability greater than the first permeability, which process comprises:
    a) providing a borehole in the contaminated area to intersect at least a first path of preferential flow and a second path of preferential flow, said second path of preferential flow being situated at a depth greater than said first path of preferential flow;
    b) placing in said borehole a first vacuum extraction pipe assembly, said first vacuum pipe assembly including a vacuum extraction pipe placed inside a riser pipe, said first vacuum extraction pipe assembly having a bottom opening situated within the first path of preferential flow;
    c) placing in said borehole a second vacuum extraction pipe assembly, said second vacuum extraction pipe assembly including a vacuum extraction pipe placed inside a riser pipe, said second vacuum extraction pipe assembly having a bottom opening situated within the second path of preferential flow;
    d) isolating the first path of preferential flow from the second path of preferential flow so that a vacuum applied to the first vacuum extraction pipe assembly with a bottom opening situated in the first path of preferential flow will extract gases and liquids from the first path of preferential flow but not from the second path of preferential flow and a vacuum applied to the second vacuum extraction pipe assembly with a bottom opening situated in the second path of preferential flow will extract gases and liquids from the second path of preferential flow but not from the first path of preferential flow;
    e) applying a vacuum to at least one of said vacuum extraction pipe assemblies to draw gases and liquid from at least one of the paths of preferential flow into a vacuum extraction pipe and transport both the gases and the liquid to the surface as a common stream;
    f) forming from the common stream a stream which is primarily liquid and a stream which is primarily gaseous; and
    g) removing contaminants from at least one of the liquid stream and the gaseous stream.

2. A process according to claim 1 wherein the ground has a vadose zone and a water table, the borehole extends to a depth below the water table, the first vacuum extraction pipe is situated within a first riser pipe having perforations situated within the first path of preferential flow, the second vacuum extraction pipe is situated within a second riser pipe having perforations situated within the second path of preferential flow, and the perforations of at least one riser pipe are situated at least below the water table.

3. A process according to claim 2 wherein the perforations in at least one riser pipe are situated only below the water table.

4. A process according to claim 2 wherein the perforations in one of the riser pipes are situated both in the vadose zone and below the water table.

5. A process according to claim 2 wherein the perforations in at least one riser pipe are situated only in the vadose zone above the water table.

6. A process according to claim 1 wherein the soil has a permeability of about $1 \times 10^{-4}$ centimeters per second or less.

7. A process according to claim 1 wherein the paths of preferential flow have a permeability of about $1 \times 10^{-3}$ centimeters per second or greater.

8. A process according to claim 1 wherein at least one of the preferential flow paths is created by a hydraulic fracturing process.

9. A process according to claim 1 wherein at least one inlet probe is provided which allows introduction into at least one of the paths of preferential flow of a fluid from a location spaced from the borehole.

10. A process according to claim 9 wherein a fluid is introduced into the first path of preferential flow through an air inlet probe while vacuum is applied to the first vacuum extraction pipe.

11. A process according to claim 9 wherein a fluid is introduced into the second path of preferential flow through an air inlet probe while vacuum is applied to the first vacuum extraction pipe.

12. A process according to claim 9 wherein a fluid is introduced into the first path of preferential flow through an air inlet probe while vacuum is applied to the second vacuum extraction pipe.

13. A process according to claim 9 wherein a fluid is introduced into the second path of preferential flow through an air inlet probe while vacuum is applied to the second vacuum extraction pipe.

14. A process according to claim 9 wherein a fluid is introduced simultaneously into the first path of preferential flow and the second path of preferential flow through at least one air inlet probe while vacuum is applied simultaneously to the first vacuum extraction pipe and the second vacuum extraction pipe.

15. A process according to claim 1 wherein a fluid is introduced into the first vacuum extraction pipe while vacuum is applied to the second vacuum extraction pipe.

16. A process according to claim 1 wherein a fluid is introduced into the second vacuum extraction pipe while vacuum is applied to the first vacuum extraction pipe.

17. A process according to claim 1 wherein vacuum is applied simultaneously to the first and second vacuum extraction pipes.

18. A process according to claim 1 wherein the paths of preferential flow each have a permeability at least ten times greater than the first permeability.

19. A process according to claim 1 wherein, upon application of vacuum to at least one of the vacuum extraction pipes, the liquid drawn from at least one of the paths of preferential flow into a vacuum extraction pipe includes water.

20. An apparatus for removing contaminants from a contaminated area of the ground comprising soil having a first permeability, and a plurality of paths of preferential flow, each path having a permeability greater than the first permeability, wherein the contaminated area of the ground is provided with a borehole extending downwardly from the surface of the ground to intersect at least a first path of preferential flow and a second path of preferential flow, the second path of preferential flow being situated at a depth greater than the first path of preferential flow, the apparatus comprising:
    a) at least a first vacuum extraction pipe assembly and a second vacuum extraction pipe assembly situated inside of the borehole, wherein each of said first assembly and said second assembly includes a vacuum extraction pipe placed inside of a riser pipe, wherein the first vacuum extraction pipe assembly has a bottom opening situated within the first path of preferential flow and the second vacuum extraction pipe assembly has a bottom opening situated within the second path of preferential flow, said first path of preferential flow being isolated from said second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow;

b) a vacuum-forming apparatus in fluid communication with the first vacuum extraction pipe and the second vacuum extraction pipe and adapted to form a zone of reduced pressure at substantially ambient temperature in the first and second paths of preferential flow around the borehole, whereby gases and liquid can be drawn from the first and second paths of preferential flow into a vacuum extraction pipe and conveyed to the surface as a common stream;

c) a vapor-liquid separator in fluid communication with said vacuum-forming apparatus and said first and second vacuum extraction pipes, wherein said vapor-liquid separator separates the common stream into separate gas and liquid streams; and d) a contaminant removal system, said contaminant removal system being situated to remove contaminants from at least one of the liquid stream and the gas stream.

21. An apparatus according to claim 20 wherein the ground has a vadose zone and a water table, the borehole extends to a depth below the water table, the first vacuum extraction pipe is situated within a first riser pipe having perforations situated within the first path of preferential flow, the second vacuum extraction pipe is situated within a second riser pipe having perforations situated within the second path of preferential flow, and the perforations of at least one riser pipe are situated at least below the water table.

22. An apparatus according to claim 21 wherein the perforations in at least one riser pipe are situated only below the water table.

23. An apparatus according to claim 21 wherein the perforations in one of the riser pipes are situated both in the vadose zone and below the water table.

24. An apparatus according to claim 21 wherein the perforations in at least one riser pipe are situated only in the vadose zone above the water table.

25. An apparatus according to claim 20 wherein the soil has a permeability of about $1 \times 10^{-4}$ centimeters per second or less.

26. An apparatus according to claim 20 wherein the paths of preferential flow have a permeability of about $1 \times 10^{-3}$ centimeters per second or greater.

27. An apparatus according to claim 20 wherein at least one of the preferential flow paths has been artificially created by a hydraulic fracturing process.

28. An apparatus according to claim 20 also comprising at least one inlet probe which allows introduction into at least one of the paths of preferential flow of a fluid from a location spaced from the borehole.

29. An apparatus according to claim 20 wherein the paths of preferential flow each have a permeability at least ten times greater than the first permeability.

30. An apparatus according to claim 20 wherein the contaminated area of the ground in which the borehole is provided contains water and wherein at least one of the vacuum extraction pipes is situated so that application of vacuum thereto extracts water from at least one of the paths of preferential flow into said vacuum extraction pipe.

* * * * *